(12) United States Patent
Hemstock

(10) Patent No.: US 11,035,216 B2
(45) Date of Patent: Jun. 15, 2021

(54) GRAVITY DESANDING APPARATUS WITH FILTER POLISHER

(71) Applicant: SPECIALIZED DESANDERS INC., Calgary (CA)

(72) Inventor: Christopher A. Hemstock, Calgary (CA)

(73) Assignee: SPECIALIZED DESANDERS INC., Calgary (CA)

( * ) Notice: Subject to any disclaimer, the term of this patent is extended or adjusted under 35 U.S.C. 154(b) by 450 days.

(21) Appl. No.: 15/991,771

(22) Filed: May 29, 2018

(65) Prior Publication Data

US 2018/0347335 A1 Dec. 6, 2018

Related U.S. Application Data

(60) Provisional application No. 62/512,600, filed on May 30, 2017.

(51) Int. Cl.
*B01D 21/00* (2006.01)
*B01D 17/02* (2006.01)
(Continued)

(52) U.S. Cl.
CPC .......... *E21B 43/38* (2013.01); *B01D 17/0217* (2013.01); *B01D 19/0042* (2013.01);
(Continued)

(58) Field of Classification Search
CPC .............. B01D 17/02; B01D 17/0211; B01D 21/0045; B01D 2221/04; B01D 17/0217;
(Continued)

(56) References Cited

U.S. PATENT DOCUMENTS 1,512,358 A 10/1924 Neill
1,535,721 A 4/1928 Gill
(Continued)

FOREIGN PATENT DOCUMENTS

BE 644340 8/1964
CA 2433741 10/2003
(Continued)

OTHER PUBLICATIONS

International Search Report received in corresponding PCT Application No. PCT/CA2018/050626 dated Aug. 8, 2018, 3 pages.
(Continued)

*Primary Examiner* — Cabrena Holecek
(74) *Attorney, Agent, or Firm* — Parlee McLaws, LLP; Patrick Laycock

(57) ABSTRACT

Apparatus and method disclosed herein related to first stage gravity separation of liquid and sand from a gaseous fluid stream in an upper portion of a desanding vessel, sand separating from gas along an annular path about a shell, the sand-free gas directed back down into the shell to a fluid outlet for removal as a product stream. A second stage gravity separation of sand from accumulated liquid occurs in a lower section of the vessel. An optional final or polishing stage of the liquid is conduct using a filter. A stacked-plate filter can extend an intake opening of the fluid outlet into the accumulated liquid. Further, the filter plates can be configured with parallel filtering of gas/liquid separation for gas intake above, and with liquid/sand separation below including pressure management of the filter operation.

6 Claims, 20 Drawing Sheets

(51) Int. Cl.
    *B01D 19/00* (2006.01)
    *B01D 29/46* (2006.01)
    *B01D 45/02* (2006.01)
    *B01D 46/40* (2006.01)
    *E21B 43/38* (2006.01)
    *E21B 43/34* (2006.01)
    *F15D 1/14* (2006.01)
    *B01D 21/24* (2006.01)
    *B01D 35/30* (2006.01)

(52) U.S. Cl.
    CPC ..... *B01D 19/0052* (2013.01); *B01D 21/0006* (2013.01); *B01D 21/0012* (2013.01); *B01D 21/0042* (2013.01); *B01D 21/2411* (2013.01); *B01D 45/02* (2013.01); *B01D 35/30* (2013.01); *B01D 2221/04* (2013.01)

(58) Field of Classification Search
    CPC ............ B01D 19/0042; B01D 19/0052; B01D 21/0006; B01D 21/0012; B01D 21/0042; B01D 21/2411; B01D 29/46; B01D 35/30; B01D 45/02; B01D 46/406; F15D 1/14; E21B 43/34; E21B 43/38
    See application file for complete search history.

(56) References Cited

U.S. PATENT DOCUMENTS

| | | | |
|---|---|---|---|
| 1,863,111 | A | 6/1932 | Greve |
| 2,227,344 | A | 12/1940 | Hartmann |
| 3,473,668 | A | 10/1969 | Bunyard et al. |
| 3,645,298 | A | 2/1972 | Roberts et al. |
| 4,348,215 | A | 9/1982 | Dehne |
| 4,517,089 | A | 5/1985 | Arnaud |
| 4,686,041 | A | 8/1987 | Van den Berg et al. |
| 4,721,567 | A | 1/1988 | Uram |
| 4,726,900 | A | 2/1988 | Keskinen et al. |
| 4,744,901 | A | 5/1988 | Drori |
| 4,753,731 | A | 6/1988 | Drori |
| 4,882,050 | A | 11/1989 | Kopf |
| 4,966,702 | A | 10/1990 | Drori |
| 5,173,195 | A | 12/1992 | Wright et al. |
| 5,292,479 | A | 3/1994 | Haraga et al. |
| 5,341,848 | A | 8/1994 | Laws |
| 5,553,669 | A * | 9/1996 | Trainer ................ B01D 29/114 166/105.1 |
| 5,935,424 | A | 8/1999 | Dyer et al. |
| 6,458,191 | B1 | 10/2002 | Lingelem et al. |
| 6,601,460 | B1 | 8/2003 | Matema |
| 6,793,177 | B2 | 9/2004 | Bonutti |
| 6,821,322 | B2 | 11/2004 | Milia |
| 6,983,852 | B2 | 1/2006 | Hemstock et al. |
| 7,210,585 | B2 | 5/2007 | Hajek |
| 8,794,574 | B2 | 8/2014 | Lang |
| 8,881,994 | B2 | 11/2014 | Wetzel et al. |
| 9,308,987 | B1 | 4/2016 | Riggins |
| 9,861,921 | B2 | 1/2018 | Hemstock et al. |
| 9,895,634 | B2 | 2/2018 | Selwyn |
| 2003/0154860 | A1 | 8/2003 | Milia |
| 2007/0131454 | A1 | 6/2007 | Hollier |
| 2011/0139893 | A1 | 6/2011 | Wetzel et al. |
| 2015/0021257 | A1 | 1/2015 | Selwyn |
| 2015/0144546 | A1 | 5/2015 | Iwasaki |
| 2015/0165358 | A1 | 6/2015 | Hemstock et al. |
| 2015/0273374 | A1 | 10/2015 | Leiss |
| 2018/0161705 | A1 | 6/2018 | Hemstock |

FOREIGN PATENT DOCUMENTS

| | | |
|---|---|---|
| CA | 2407554 | 4/2004 |
| CA | 2535215 | 4/2004 |
| CA | 2799278 | 8/2013 |
| CA | 2873355 | 6/2015 |
| CN | 203598568 | 5/2014 |
| FR | 872264 | 6/1942 |
| GB | 836122 | 10/1930 |
| GB | 1022293 | 3/1966 |
| GB | 1048873 | 11/1966 |
| JP | 2005074362 | 3/2005 |
| JP | 2012139681 | 7/2012 |
| WO | 2013128171 | 9/2013 |
| WO | 2017084657 | 5/2017 |

OTHER PUBLICATIONS

Written Opinion received in corresponding PCT Application No. PCT/CA2018/050626 dated Aug. 8, 2018, 5 pages.
International Preliminary Report on Patentability received in corresponding PCT Application No. PCT/CA2017/051484 dated Apr. 4, 2019, 26 pages.
International Search Report received in corresponding PCT Application No. PCT/CA2017/051484 dated Feb. 27, 2018, 3 pages.
Written Opinion of the International Searching Authority received in corresponding PCT Application No. PCT/CA2017/0514E34 dated Feb. 27, 2018, 5 pages.
International Search Report received in corresponding PCT Application No. PCT/CA2018/050824 dated Sep. 14, 2018, 3 pages.
Written Opinion of the International Searching Authority received in corresponding PCT Application No. PCT/CA2018/050824 dated Sep. 14, 2018, 5 pages.
International Search Report received in corresponding PCT Application No. PCT/CA2018/050822 dated Aug. 9, 2018, 3 pages.
Written Opinion of the International Searching Authority received in corresponding PCT Application No. PCT/CA2018/050822 dated Aug. 9, 2018, 4 pages.
International Preliminary Report on Patentability received in corresponding PCT Application No. PCT/CA2014/051170 dated Jun. 21, 2016, 4 pages.

* cited by examiner

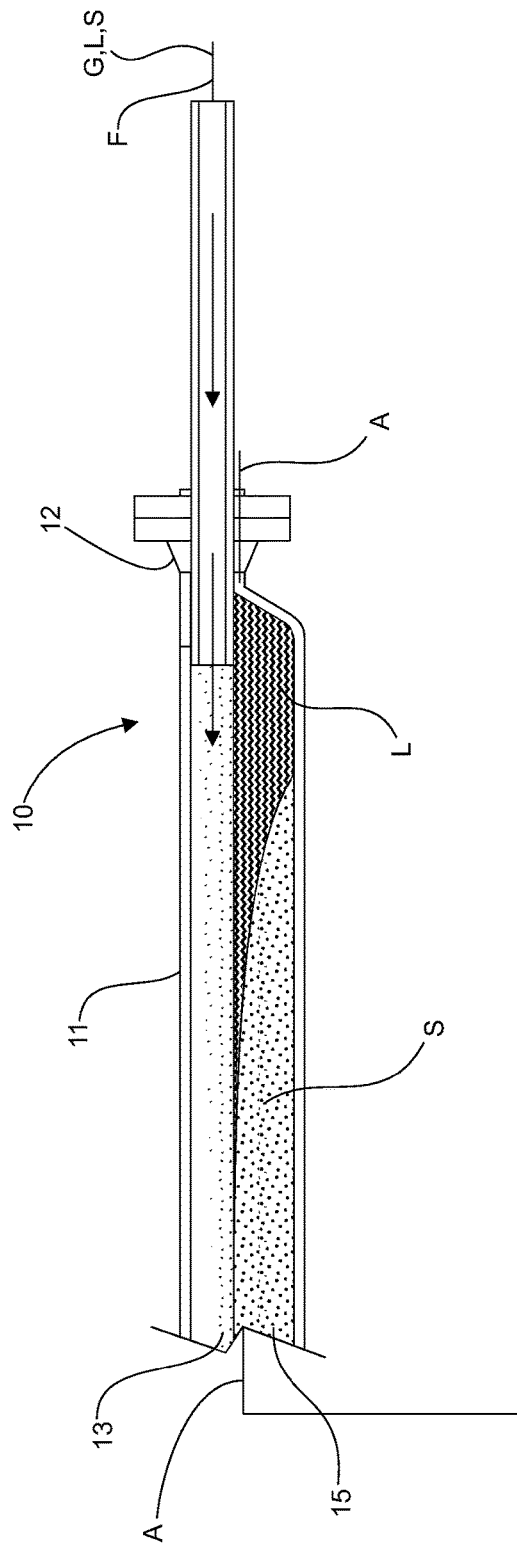
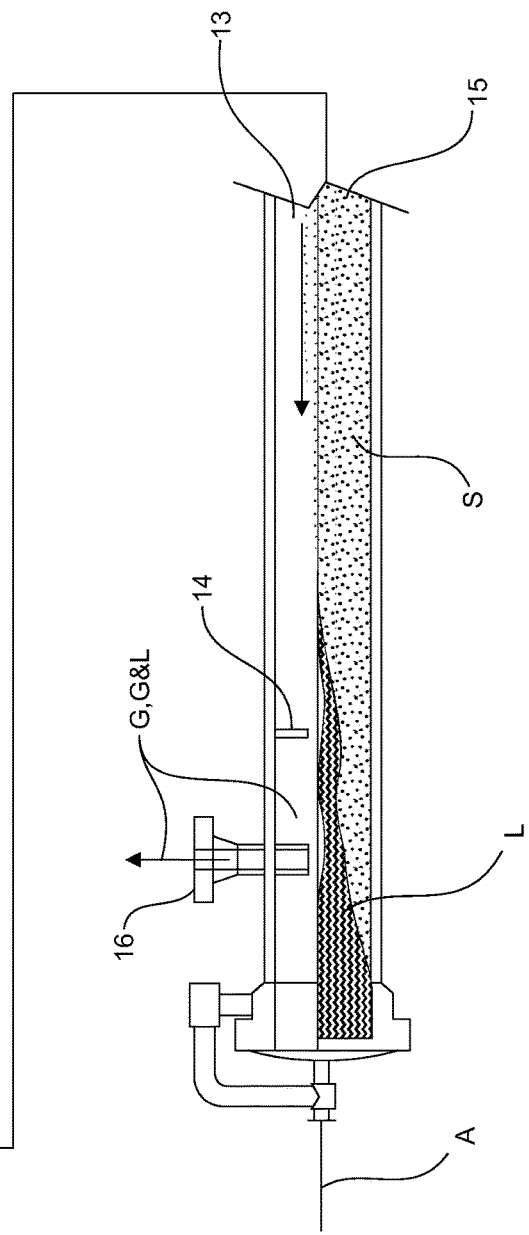
Fig. 1
PRIOR ART

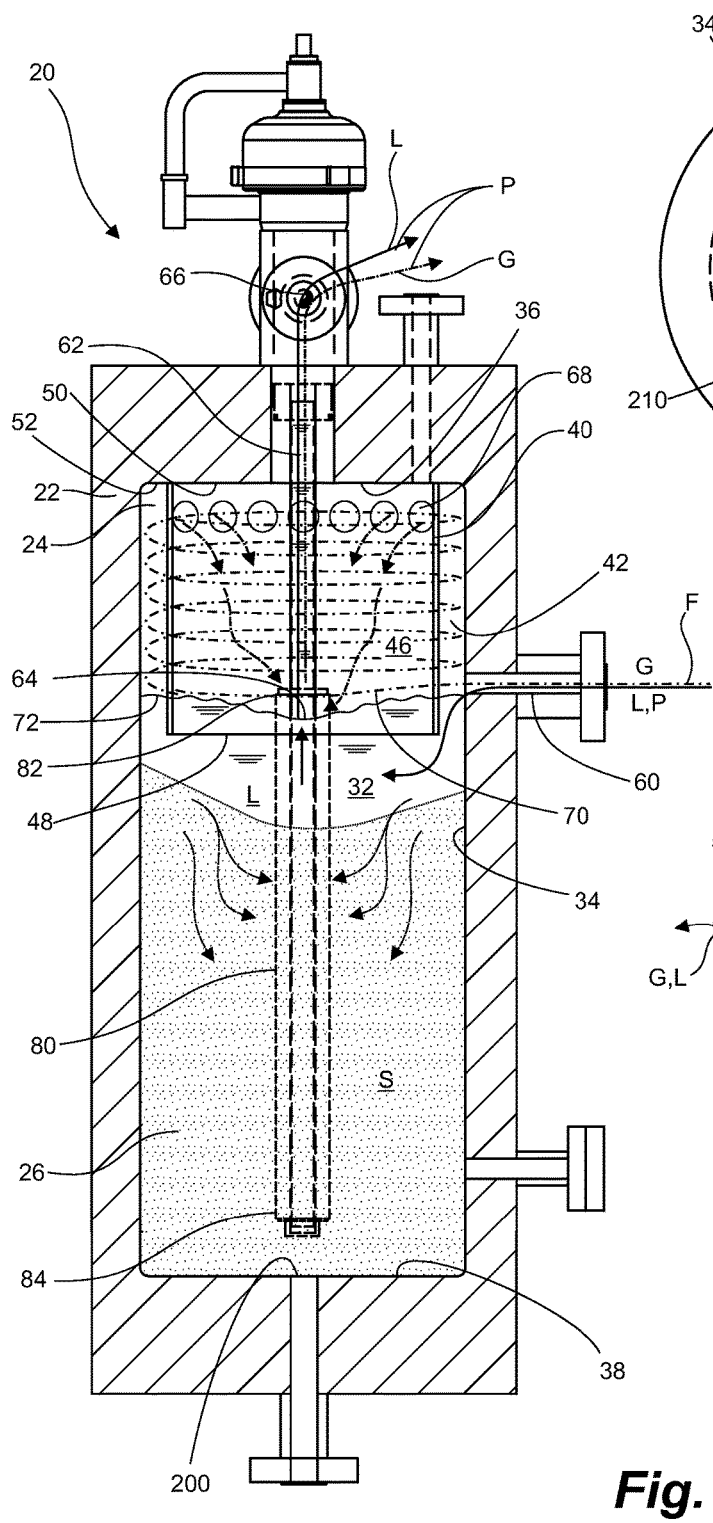
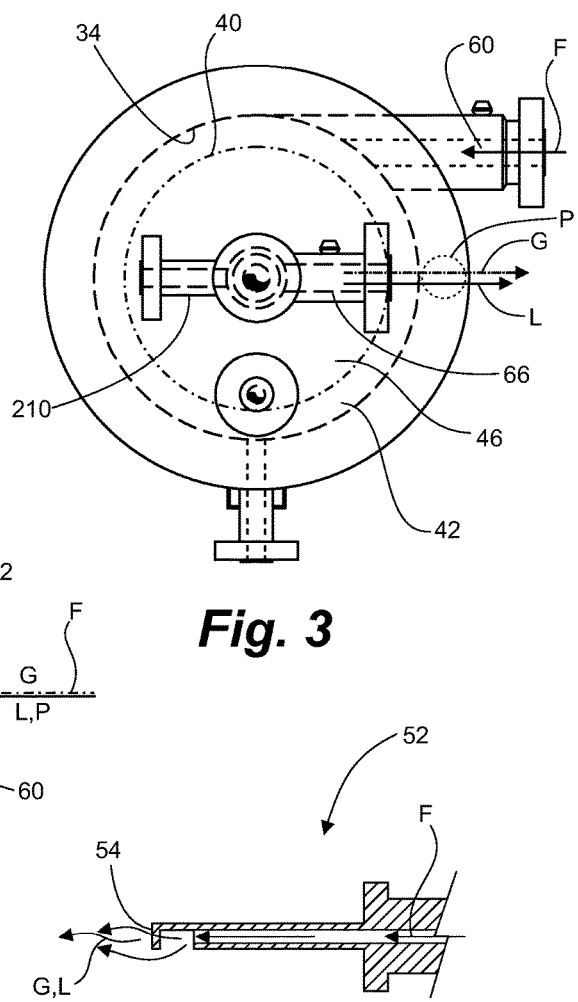
Fig. 3
Fig. 12
Fig. 2

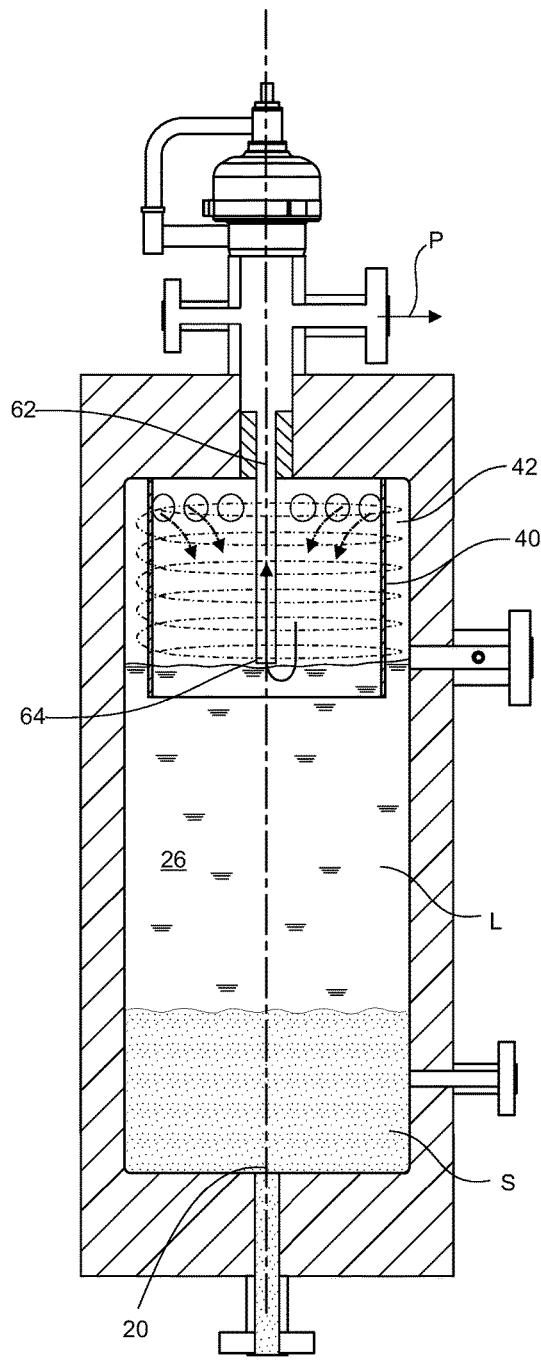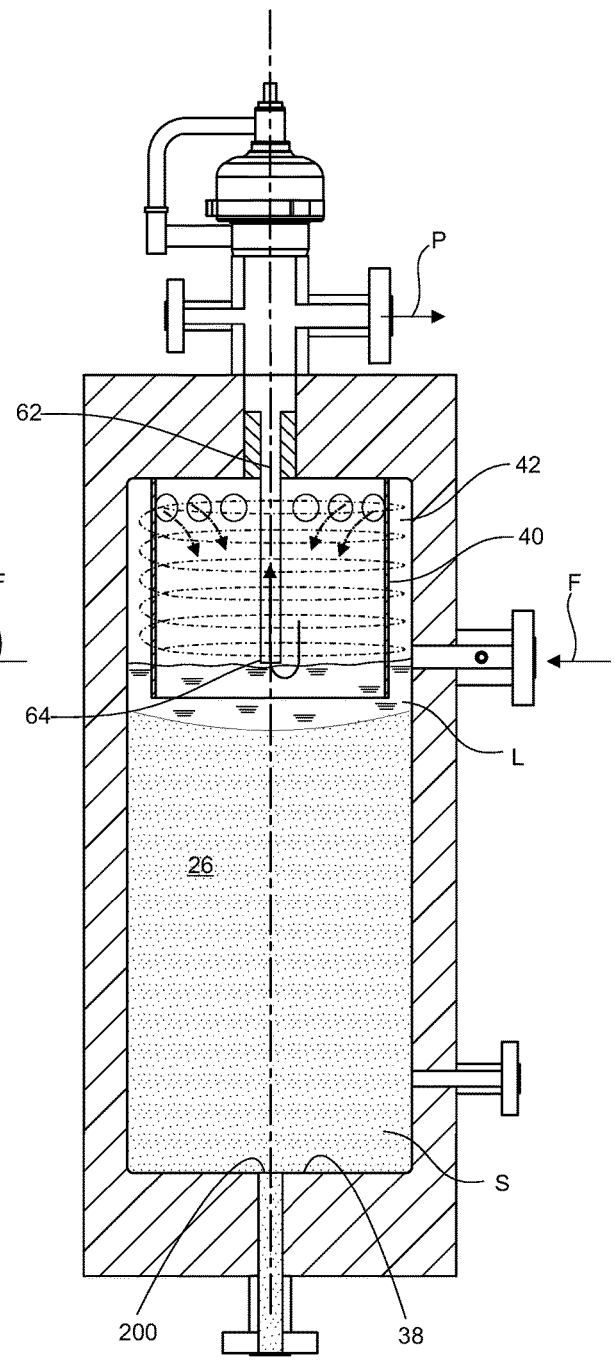
*Fig. 16A*  *Fig. 16B*

GRAVITY DESANDING APPARATUS WITH FILTER POLISHER

CROSS-REFERENCE TO RELATED APPLICATIONS

This application claims priority of U.S. provisional patent application Ser. No. 62/512,600, filed on May 30, 2017, the content of which is incorporated herein by reference in its entirety.

FIELD OF THE DISCLOSURE

The present disclosure generally relates to an apparatus and a method for removing sand from multiphase fluid streams, and in particular, relates to an gravity, filter or combinations of apparatus and methods for removing sands from multiphase fluid streams produced from an oil or gas well while minimizing the abrasion to the equipment downstream thereof.

BACKGROUND

Production from wells in the oil and gas industry often contains sand such as sand. These sand could be part of the formation from which the hydrocarbon is being produced, introduced from hydraulic fracturing, or fluid loss material from drilling mud or fracturing fluids, or from a phase change of produced hydrocarbons caused by changing conditions at the wellbore (Asphalt or wax formation). As the sand is produced, problems occur due to abrasion and plugging of production equipment. In a typical startup after stimulating a well by fracturing, the stimulated well may produce sand until the well has stabilized, often lasting for several months after production commences. Other wells may produce sand for a much longer period of time.

Erosion of the production equipment can be severe enough to cause catastrophic failure. High fluid stream velocities are typical and are even purposefully designed for elutriating particles up the well and to the surface. An erosive failure of this nature can become a serious safety and environmental issue for the well operator. A failure, such as a breach of high pressure piping or equipment, releases uncontrolled high velocity flow of fluid which is hazardous to service personnel. Releasing such fluid to the environment is damaging to the environment resulting in expensive cleanup and loss of production. Repair costs are also high.

In all cases, retention of sand contaminates surface equipment and the produced fluids and impairs the normal operation of the oil and gas gathering systems and process facilities. Therefore, desanding apparatus are required for removing sand from the fluid stream. Due to the nature of the gases handled, including pressure and toxicity, all vessels and pressure piping in desanding apparatus must be manufactured and approved by appropriate boiler and pressure vessel safety authorities.

In one existing system, a pressurized tank ("P-Tank") is placed on the wellsite and the well is allowed to produce fluid and sand. The fluid stream is produced from a wellhead and into a P-Tank until sand production ceases. The large size of the P-Tank usually restricts the maximum operating pressure of the vessel to something in the order of 1,000-2,100 kPa. In the case of a gas well, this requires some pressure control to be placed on the well to protect the P-Tank. Further, for a gas well, a pressure reduction usually is associated with an increase in gas velocity which in turn makes sand-laden wellhead effluent much more abrasive and places the pressure controlling choke at risk of failure. Another problem associated with this type of desanding technique is that it is only a temporary solution. If the well continues to make sand, the solution becomes prohibitively expensive. In most situations with this kind of temporary solution, the gas vapors are not conserved and sold as a commercial product.

Hydrocyclone or cyclone devices are also known for separating particles from liquid mixture by exploiting the centripetal force. By injecting the liquid mixture into a vessel and spinning therein, heavy or large particles move outward towards the wall of the vessel due to the centripetal force, and spirally move down to the bottom of the vessel. Light components move towards the center of the vessel and may be discharged via an outlet. However, hydrocyclone devices have difficulty in separating sand from effluents with more than two phases, and have an associated pressure drop issue that is undesirable in many oilfield situations.

In Canadian Patent Number 2,433,741, issued Feb. 3, 2004, and in Canadian Patent Number 2,407,554, issued Jun. 20, 2006, both assigned to the Applicant of the subject patent application, a desander is disclosed having an elongate, horizontal vessel with an inlet at one end and an outlet at the other end. As shown in FIG. 1, the desander 10 comprises a cylindrical pressure vessel 11 having a substantially horizontal axis A and a first fluid inlet end 12 adapted for connection to the fluid stream F. The fluid stream F typically comprises a variety of phases including gas G, some liquid L, and entrained particulates such as sand S. The fluid stream F containing sand enters through the inlet end 12 and is received by a freeboard portion 13. The freeboard area is set by a downcomer flow barrier, or a weir, 14. Accordingly, the velocity of the fluid stream F slows to a point below the entrainment or elutriation velocity of at least a portion of the sand S in the fluid stream. Given sufficient horizontal distance without interference, the sand S eventually fall from the freeboard portion 13. Sand S and liquids L accumulate over time in the belly portion 15, and the desanded fluid stream, typically liquid L and gas G, emanates from fluid outlet 16.

Such vessels are currently operating a working pressure of between 5,000 kPa (725 psi) and 69,000 kPa (10,000 psi).

The accumulated sand in the vessel require periodical clean-out at sufficient intervals to ensure that the maximum accumulated depth does not encroach on the fluid outlet 16. However, for larger vessels, manual cleaning becomes difficult and time consuming.

While the desanding apparatus disclosed in the above Canadian patents has been a great success over the past several years, improvements are possible. Canadian Patent Application Number 2,799,278, filed on Dec. 19, 2012, and assigned to the Applicant of the subject application, discloses a desander device having a tilted vessel to remove the need for a downcomer flow barrier. However, this desander requires the vessel to be depressurized to remove sand causing downtime and in some cases a hazard for workers as the effluent can contain toxic substances.

Trends in fracturing industry have evolved to where the amount of sand pumped downhole is now in the order of 10,000 tonnes (20 million pounds) per well in multi stage fractures. Correspondingly, the amount of sand produced in flow back operations has increased and it is not unusual for a well to produce 50 tonnes (100,000 pounds) of sand. Desanding capabilities must increase accordingly.

In Canadian Patent application 2,873,355, published Jun. 16, 2015, assigned to the Applicant, a desander is disclosed having an internal cylindrical shell having an inlet for receiving the fluid stream and directing the fluid stream generally horizontally into a baffle having an elongated spiral flow path from the fluid inlet to a central fluid outlet. The baffle has an open top and an open bottom for enabling sand S and any liquid to fall from the baffle and gas to collect above the baffle for removal. The sand S settles in a lower section below the baffle.

Another known system includes employing filters to remove sand including a number of fiber-mesh filter bags placed inside a pressure vessel. The density of the filter bag fiber-mesh is matched to the anticipated size of the sand. Filter bags are generally not effective in the removal of sand in a multiphase condition. Usually multiphase flow in the oil and gas operations is unstable. Large slugs of fluid followed by a gas mist are common. In these cases, the fiber bags can blind off becoming a major cause of pressure drop and often fail due to the liquid presence. Thus, filter bags are avoided in critical applications and due to cost associated with replacement and subsequent disposal as contaminated waste.

Some other prior-art desanding apparatus use plate filters and/or screens for removing sand from an input fluid stream. For example, stacked plate or multiple-disc type filters are known, such as in U.S. Pat. No. 4,753,731 to Drori, and US application US2015/0144546, published May 28, 2015, each of which disclose a plurality of paired, cooperating disc-like filter surfaces. Such designs are designed to form annular pockets between adjacent discs for receiving and holding foreign particles separated from the fluid. As stated by Drori, multiple-disc filters have a number of advantages over the apertured screen type including removal and retention of higher quantities of foreign particles, and higher resistance to damage. However, these prior-art desanding apparatus have drawbacks such as low or even marginal tolerance for pressure drop, and usually collapse at differential pressures of about 100 psi. Another drawback of such prior-art devices is that the screens thereof are easily plugged or clogged due to the accumulation of sand thereon.

Therefore, there continues to exist a desire for further improving the ease with which an oil and gas process vessel can be unclogged and cleaned, and for seeking further improvement in separation efficiency.

SUMMARY

A desanding apparatus is provided for removing sand from a fluid stream. A cylindrical, pressurized vessel receives a fluid stream at a first velocity from field piping fluidly connected to and extending from a wellhead. The vessel removes sand from the received fluid stream in a gravity separation process. The fluid stream is introduced to an annulus formed between a baffle and the cylindrical vessel wall, the velocity of the fluid stream falling to a second slower velocity. The gas flows up the annulus at less than an elutriation velocity, sand falling out the open bottom of the annulus. The annulus is located at the periphery of the vessel's interior for achieving a lower second velocity.

Up-rising and sand-free gas is redirected downward to a fluid outlet for removal from the vessel for discharge of the desanded product stream. In an embodiment, the baffle is an open-bottomed shell having therethrough at an elevation above the fluid inlet for redirection back down through a chamber within the shell to the intake opening. The gravity separation is independent of the allotted volume for accumulation of sand. Periodically, or when capacity is reached, the accumulated sand is readily removed using a purge or backflush, or both.

The above arrangement also handles process conditions where the fluid stream includes liquid at mass rates that accumulate in the vessel. The removal of sand from gas is not adversely affected; indeed, the sand and liquid falling from the fluid stream accumulate and sand is captured in the liquid. Sand settles by gravity in the liquid and clarified liquid is aspirated with the gas at an intake opening of the fluid outlet, at a liquid-gas interface, the clarified liquid joining the gas product stream.

In yet another arrangement with liquid in the fluid stream, clarification of the accumulated liquid before discharge from the vessel can be polished using a polisher such as a filter at the intake opening of the fluid outlet. A stacked-plate filter can extend downward into the accumulated liquid for excluding sand in upset condition or otherwise has not fully settled. In another embodiment, the baffle can have open top and bottom, such as Applicant's prior spiral baffle, the intake opening being fit with the present filter arrangement for polishing the liquid portion of the product stream.

Compared to prior art desanders, the desanding apparatus has the advantage of requiring less horizontal operational space. For example a desander as described in U.S. Pat. No. 6,983,852, assigned to the Applicant of the subject application, includes a horizontally oriented vessel having a nominal 0.3 meter (i.e., 12 inches) diameter and a 3.048 meters (i.e., 10 feet) length. Another desander as described in the same US patent but for a different operational condition includes a vessel having a 0.3 meter (i.e., 12 inches) diameter and a 6.096 meters (i.e., 20 feet) length, oriented horizontally. To compare, the current desanding apparatus stands upright, and can have a vessel diameter of, for example, 1.2 meters (i.e., 48 inches). The height of the lower section can be, for example, 0.45 meters (i.e., 18 inches).

Further, the vessel is relatively easy to clean out, without opening the vessel up to the atmosphere. While online, a double dump sand discharge apparatus permits on-the-fly sand purging. Offline, a backflush system can be employed. The backflushing can also be applied for clearing a fouled filter.

In an aspect, a vessel for removing sand from a multiple-phase fluid stream comprises a fluid inlet for discharging the fluid stream into the vessel, a closed-top shell having an open bottom at an elevation below the fluid inlet and at least one shell aperture in at least one side wall at a level above the fluid inlet, a fluid outlet comprising an intake opening in the vessel in fluid communication with the inside of the shell and at a level at or above the bottom of the shell, and a discharge opening for discharging a desanded gas stream out of the vessel. The shell is configured to direct the fluid stream from the fluid inlet generally horizontally along a flow path in an annulus about the exterior of the closed-top shell, whereby gas from the multiple-phase fluid stream can pass inwardly through the at least one shell aperture to the fluid outlet intake opening and out the discharge opening.

In another aspect, the intake opening further comprises a filter to exclude sand that otherwise might travel to the intake opening of the fluid outlet.

In another aspect, the intake opening further comprises a stacked plate filter, the filter further implementing a plurality of plate-to-plate interfaces to exclude sand that otherwise might travel to the intake of the fluid outlet.

In another aspect, the vessel comprises a primary gravity separation zone followed by a stacked plate filter.

In a further aspect, a method of removing sand from a multiple-phase fluid stream comprises the steps of providing a vessel and a closed-top shell within the vessel having an open bottom and at least one shell aperture in at least one side wall, and a fluid outlet comprising an intake opening within the vessel in fluid communication with the inside of the shell and at a level at or above the bottom of the shell and a discharge opening for discharging a desanded gas stream out of the vessel, injecting the fluid stream along a generally horizontal fluid injection direction into the vessel on the exterior of the shell at a level above the bottom of the shell and below the level of at least one of the at least one shell aperture via a fluid inlet to allow at least a portion of the entrained sand to fall out of the fluid stream and move into an lower section, collecting desanded gas in a freeboard portion, the freeboard portion being above the lower section and being separated therefrom by a freeboard interface, receiving the desanded gas from the freeboard portion through the at least one shell aperture into the shell, and discharging the desanded gas via the fluid outlet. The multi-phase stream further includes liquid, the freeboard interface formed by a liquid-gas interface, the freeboard interface at a level at or above the bottom of the open bottom of the shell.

In embodiments, the closed-top shell has an open bottom at an elevation below the fluid inlet and at least one shell aperture in the at least one side wall at a level above the fluid inlet encourages separation of a portion of the interior space of the vessel about and below an intake end of the fluid outlet into an inner shell space and an outer shell space, said inner shell space being in fluid communication with said outer shell space via the at least one shell aperture and the open bottom of the shell. Sand fall out of the fluid stream in the outer shell space into the lower section, while desanded gas can be collected in the freeboard portion, the freeboard portion being above the lower section and being separated therefrom by a freeboard interface. The desanded gas can move from the outer shell space in the freeboard portion into the separated inner shell space through the at least one shell aperture. The desanded gas within the inner shell space can be discharged from the inner shell space via the intake to be fluid outlet, wherein the desanded gas is free of a substantial portion of the sand. In this way, the forced separation of outer and inner shell spaces prevents the fluid stream from moving directly to the intake opening of the fluid outlet, which can result in a more effective separation of gas G, liquid L, and sand S.

BRIEF DESCRIPTION OF THE DRAWINGS

Example embodiments are provided in the accompanying detailed description which may be best understood in conjunction with the accompanying diagrams where like parts in each of the several diagrams are labeled with like numbers, and where:

FIG. 1 is a cross-sectional side view of Applicant's prior art elongated, horizontal desander illustrating a downcomer flow barrier, fluid streams, a falling trajectory of sand under the influence of gravity, and accumulations of separated liquid, sand and sand-free fluid discharge of gas and liquid;

FIG. 2 is a cross-sectional side view of one embodiment of the current desanding apparatus having an internal shell for facilitating gravity separation above a liquid and sand accumulation chamber below, a filter stack depending from the fluid outlet into the accumulation chamber;

FIG. 3 is a top view of the desanding apparatus of FIG. 2, with broken lines showing the vessel and the shell;

FIG. 12 is a top plan view of a replaceable nozzle suitable for insertion in the flanged fluid inlet of FIG. 3;

FIG. 16A is a cross-sectional side view of another embodiment of a desanding apparatus having an internal shell for facilitating gravity separation above a liquid and sand accumulation chamber below;

FIG. 16B is a cross-sectional side view of the desander according to FIG. 16A having the accumulation chamber nearly filled with sand;

DETAILED DESCRIPTION

Figure 4:
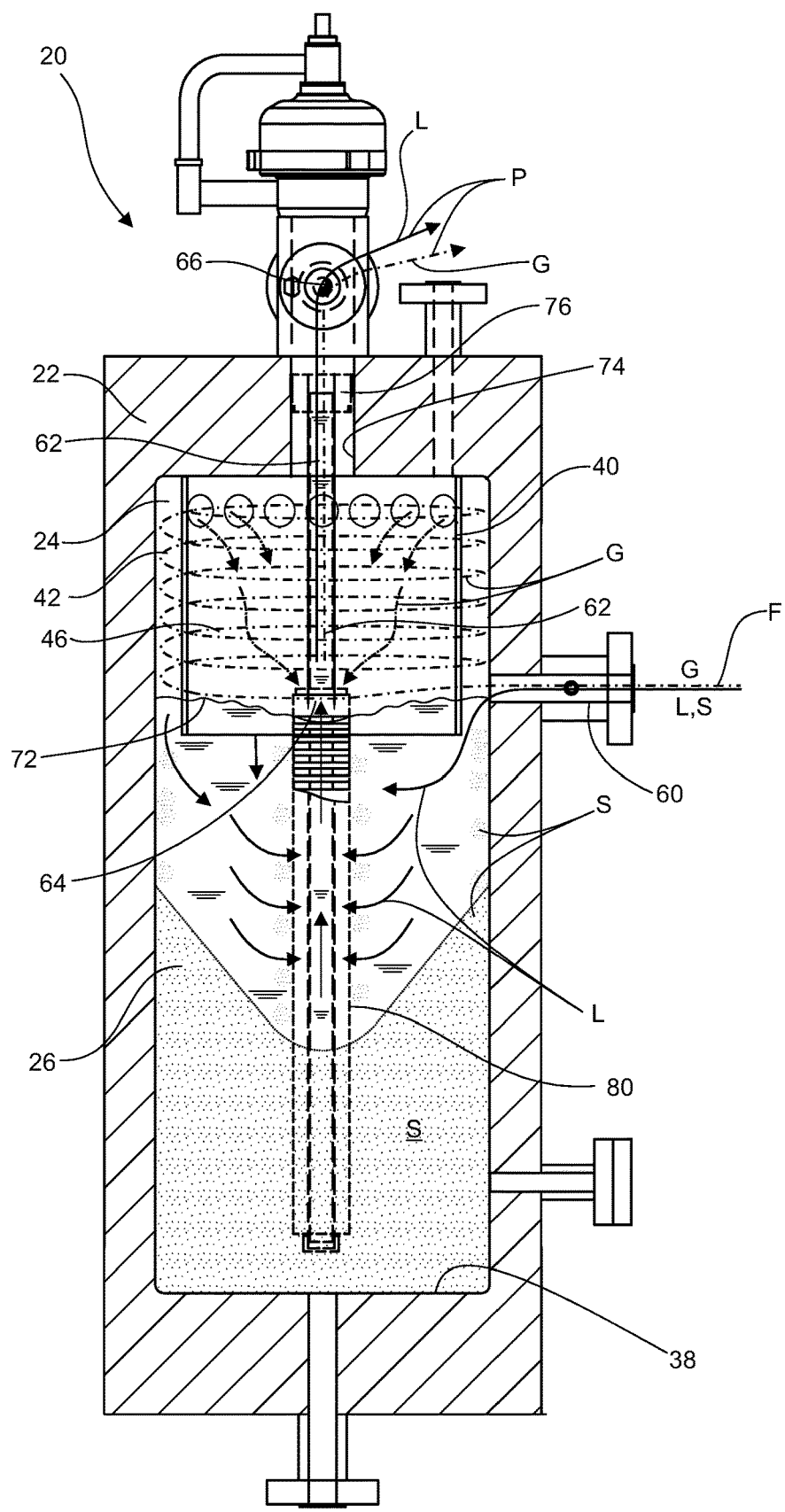
FIG. 4 is a cross-sectional side view of the desanding apparatus according to FIG. 2 in steady state operation.
Figure 5:
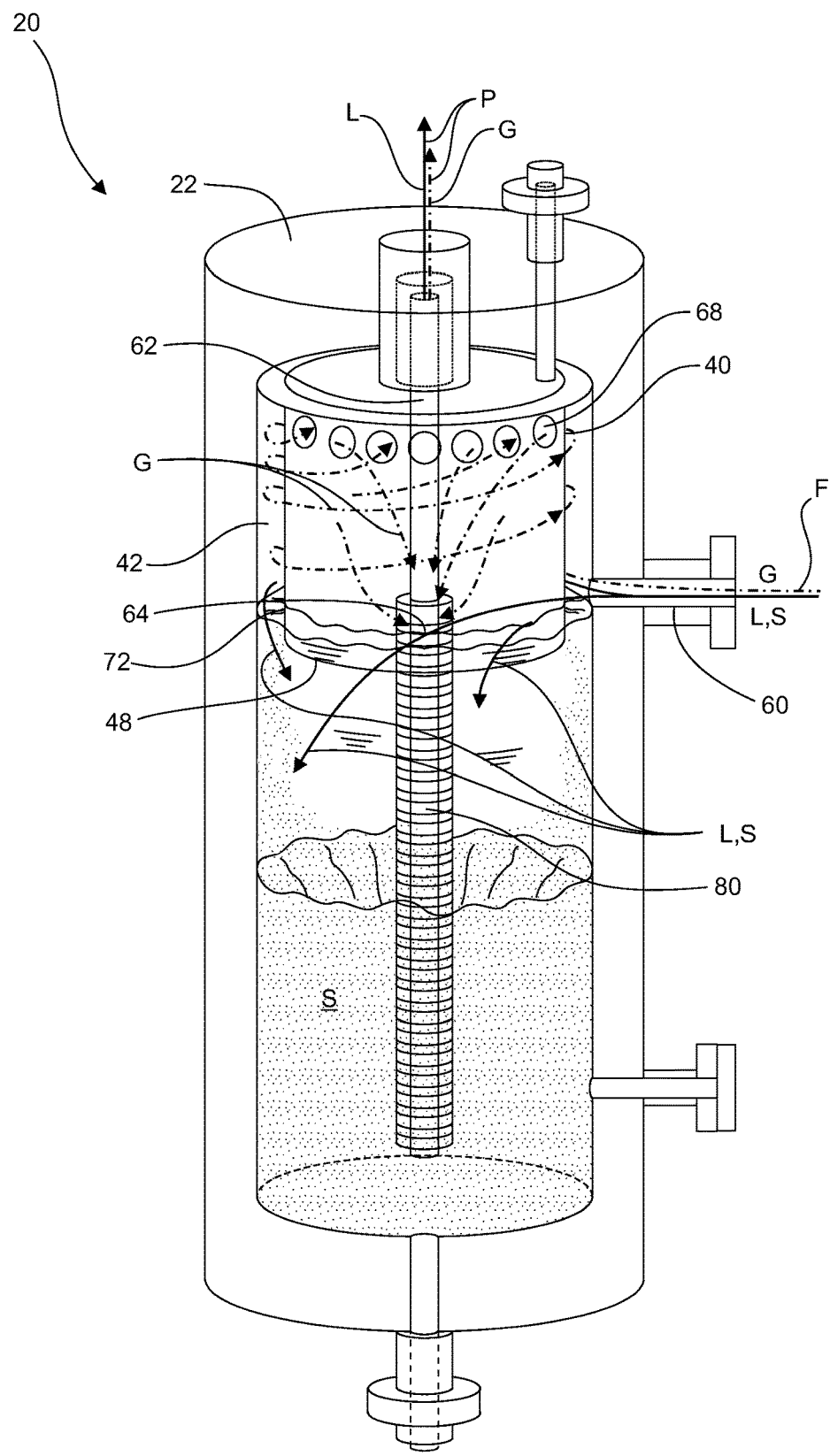
FIG. 5 is perspective view of the desanding apparatus according to FIG. 4.

A sand separator or desanding apparatus is typically inserted between, or as a replacement for, existing connecting piping coupled to a wellhead and downstream equipment such as production piping, valves, chokes, multiphase gas/liquid separators and other downstream equipment. The use of the desanding vessel may be over a fixed term, only during high sand production, or can be permanent installation dependent upon the well. The desanding apparatus exploit gravity to separate particulate from the multiphase fluid stream F injected into a vessel having a limited footprint, which provides significant advantages for use in oil and gas sites that offer limited operational real estate.

As described in more detail below, the desanding apparatus comprises a vessel that receives, via a fluid inlet, a multiphase fluid stream F from the wellhead at a first velocity, for separation of stream constituents. Herein, the multiphase fluid stream F entering the vessel typically comprises a variety of constituents or phases including gas G, some liquid L and entrained particulates such as sand S. The liquid is typically water and can include light oil. The vessel comprises a baffle in an upper section for directing the fluid stream F along a generally annular path at a second velocity, lower than the first velocity, whereby sand S falls from the fluid stream under gravity into a lower section. The remaining stream that exits the vessel is a sand-free or desanded product stream P, comprising at least the gas G. For fluid streams also entraining liquid, liquid L also falls with the sand S and the desanded product stream P also includes a clarified liquid.

At steady-state, incoming liquid L and sand S enter or fall into the lower section. Sand S and liquid L accumulate in the lower section at the bottom of the vessel, the liquid L building to a steady-state level. Continued contribution of liquid L from the fluid stream F results in an equal mass balance of liquid being produced with the gas. The produced liquid L is also sand-free. The sand S settles about the periphery of the lower section at the bottom of the vessel. A substantially sand-free, clarified liquid L develops at the gas-liquid interface, adjacent the middle of the vessel. The clarified liquid is re-entrained with sand-free gas G an intake opening of the fluid outlet at the gas/liquid interface.

Periodic process upsets or high liquid rates can disturb the settling of sand in the lower section and, as a result, liquid L that is not fully clarified can be further polished with a filter.

In more detail and with reference to FIG. 2, a hybrid desanding apparatus 20 is presented for separating at least sand S from the multiphase fluid stream F injected into a vessel 22. Herein, and throughout for consistency, particulates are simply referred to as sand S. Both gravity separation and filters are employed for production of a sand-free gas G and sand-free liquids L from the fluid stream F.

As shown, embodiments use a first stage gravity separation of liquid L and sand S from gas G in an upper portion 24 of the vessel 22, a second stage gravity separation of sand from liquid in a lower section 26 of the vessel 22, and a final or polishing stage of the liquid using a filter. In other embodiments, the vessel 22 can be equipped with simply the first and second stages; others with all three stages and in other embodiments the filtering stage can be parallel filtering for pressure management of the sand-free gas and liquids at the fluid intake.

General

The vessel 22 is an upright having a generally cylindrical vessel interior 32, a central vertical axis and an interior vessel wall 34. The vessel interior 32 has a top 36 and a bottom 38. The vessel's interior 32 is fit with an internal tubular baffle or shell 40 depending from a top 36 and extending downwardly along a portion of the axial height of the interior wall 34 forming an outer shell annulus 42 therebetween. As can best be seen in FIG. 3, the vessel interior 32 and shell 40 both have circular cross-sections.

The shell 40 is concentric within the vessel interior 34 for forming an inner gas collection chamber 46 within, the collection chamber 46 having a bottom edge 48 of side wall 44, the chamber 46 being open to the vessel's interior 32 therebelow.

The height of the shell 40 can be manufactured according to the cross-sectional area of the annulus 42. For example, in one embodiment, the width of the passage created by the annulus 42 is about 6 inches, and the height of the shell is about 18 inches.

The shell 40 and the annulus 42 are closed at their upper extents, in this embodiment by the top 36 of the vessel 22, for preventing the escape of fluid from either a top 50 of the collection chamber 46 or the top 52 of the shell annulus 42, in this embodiment both coincident with the top 36 of the vessel 22.

A fluid inlet 60 is fluidly coupled to the vessel interior 34, at an elevation intermediate the height of the shell 40, located between the vessel's top 36, and the shell's bottom edge 48. As shown, a fluid outlet 62 extends from the vessel interior 34 and out the vessel 22 for discharge of a desanded product stream P. The fluid outlet 62 comprises an entrance of intake opening 64 for receiving sand-free products and a product port 66 outside the vessel 22. The intake opening 64 is located within the shell's collection chamber 226, at elevation below the fluid inlet 60, at about the shell's bottom edge 48.

The fluid inlet 60 directs the fluid stream F into the annulus 42 between the shell 40 and the vessel's inner wall 34, the fluid inlet 60 oriented generally tangential to both the shell 40 and inner wall 34. As the fluid stream entrains sand, the fluid inlet can be vulnerable to sand erosion. In an embodiment, a replaceable nozzle as set forth in Applicant's Patent CA 2,535,215 issued May 8, 2008, may be used. With reference to FIG. 12 the fluid inlet 60 can further comprise a replaceable nozzle 52 having a discharge end 54 for discharging the injected fluid stream F into the annulus 42. The replaceable nozzle 52 extends into the vessel 22 and does not form a pressure boundary such that erosion of the nozzle 52 would not compromise any pressure rating of the vessel 22.

The nozzle's discharge end 54 breaks any high velocity slug flow entering the vessel 22 and assists to protect the pressure boundary at the inner wall 34.

The collection chamber 46 is in fluid communication with the shell annulus 42 through one or more apertures 68 adjacent the closed top 50 of the shell 40. In this embodiment, the shell 40 is fit with a plurality of apertures 68, at a level above the fluid inlet 60 for fluid communication between the chamber 46 and the shell annulus 42. For maximal gravity separation of gas from the balance of the fluid stream F, the apertures 68 are spaced above the fluid inlet 60, and in the illustrated embodiment, located adjacent the shell's top 50. The number and size of apertures 68 impose a minimal pressure drop on the gas G passing therethrough. In some aspects, there can be a single shell aperture 68, for example, in the form of a horizontal slit about a portion of a circumference of the top of the shell 40. In other aspects as shown, there could be a plurality of ports forming a row of shell apertures 68 along the shell's top 50.

Further, the intake opening 64 can be generally centered within the shell 22. In the aspect shown, the shell's closed top 50 is coincident with the top 34 of the interior of the vessel 22. However, in some aspects, the shell's closed top 50 (See FIG. 15A) could be fluid barrier separate from the vessel, with the fluid outlet 62 protruding downward through this closed top 50 and into the collection chamber 46. In this alternative aspect, the shell 40 can be suspended within the vessel interior by supporting structure (not shown). For manufacturing and connection convenience, the fluid outlet 62 is directed out of the vessel top 36 and need not cross the shell 40 or vessel side wall 34 interfaces.

The fluid inlet 60 is positioned at a location sufficiently above the shell's open bottom 48 to urge the fluid stream F into the upper portion 24, about the annulus 42, and upwardly to the apertures 68, without short circuiting to flow directly underneath the shell's open bottom 48 to the intake opening 64. Therefore, the length of the passage formed by the annulus 42, from the fluid inlet 60 around the shell 40 and through the shell apertures 68 is greater than that which would otherwise be the direct distance of travel between the fluid inlet 60 and the fluid outlet 62.

The vessel interior 32 is characterized by the upper portion or freeboard section 24 and the lower section 26. The upper freeboard section 24 can accommodate gas G separated from the injected multiphase fluid stream F, while the lower section 26 receives sand S and liquid L gravity separated from the injected fluid stream F. The freeboard and lower sections 24,26 are distinguished by the elevation of the gravity separation of gas G from heavier components. Depending on the relative elevations of the fluid inlet 60 and intake opening 64 of the fluid outlet 62, the freeboard interface 70 can be the same as a gas/liquid interface 72.

The vessel interior 32 and shell 40 provide separation of at least sand S from the gas G portion of the fluid stream F. As the movement of the fluid flow in a vessel can be generally, liquid L and sand S is complex, the inclusion of the shell 40, can act to reduce turbulence, minimizing or eliminates sand S flow to the fluid outlet 62. The fluid stream F enters the shell annulus 42 and travels along an elongated, circular flow path thereabout, the non-gas components falling under the influence of gravity downwardly out of the annulus, the trajectory of the falling sand S and liquid L converging with the gas/liquid interface 72 and into the lower section 26 below.

Gravity and a decrease in the velocity of the fluid stream F entering the vessel interior 32, aids in the gravity separation of entrained components. The annulus 42 generally presents flow dynamics sufficient for encouraging removal of sand S from the fluid F injected therein and, more particularly, can have a cross-sectional area larger than that of the fluid inlet 60 such that a second velocity of the fluid F in the vessel 22 is reduced compared to the first velocity of that leaving the fluid inlet 60.

When gas G approaches the intake opening 64, the velocity of gas G may locally increase, however, this only occurs after the sand S has dropped out of the gas phase of the fluid stream F. Liquid L accumulating in the lower section 26 is generally stagnant or quiescent, governed by fluid drag from the motion of the liquid L in the cylindrical section, and has a minimal velocity. Sand S falling into this section can be considered removed from the flow stream F.

Gas G rises through the annulus 42 into the freeboard section 24, substantially free of sand S and liquid S, and passes through the shell apertures 68 into the chamber 46. The desanded gas G encounters the closed top 50 and travels back down inside the chamber 46, seeking the intake opening 64. The intake opening 64 is open for receipt of the sand-free gas G with minimal pressure drop. Sand S has already fallen from the annulus 42 and collects in the lower section 26.

In embodiments, the fluid stream F includes liquid L which falls with the sand S and accumulates in the lower section 26. The liquid level builds over time up to the elevation of the intake opening 64 of the fluid outlet. The gas/liquid interface 72 forms at the intake opening 64, the freeboard section 24 being thereabove above, and the lower section 26 therebelow. As liquid L continues to enter the vessel 22, entrained with the fluid stream, a steady state is achieved, an incoming rate of incoming liquid L being matched with an outgoing rate of clarified liquid L. The outgoing liquid L, that would otherwise flood the fluid outlet, is aspirated with the gas G leaving the vessel.

Second Stage

The accumulated liquid forms a liquid settling zone in the lower section 26. Sand S, that falls from the fluid stream F, is received in the accumulated liquid L and settles to the bottom 38 of the vessel. Sand S falls from the annulus 42 adjacent the shell wall 34. As stated above, the liquid L accumulating in the lower section 26 is generally stagnant or quiescent. The liquid L at the gas/liquid interface and near the axis of the vessel 22 contains the least amount of sand S, ready for removal with sand-free gas at the intake opening 64.

With reference to FIGS. 13, 16A through 17, the first stage of gravity separation of gas and non-gas components about a shell 40 is sufficient for release of sand S and liquid L from the gas G. The second stage of settling in the lower section 26 is similarly capable of separating liquid and sand. Barring a process upset, the third stage of filtering may not add significant value.

However, with process operations subject to occasional slug flows of liquid L, the otherwise quiescent liquid L in the lower section 26 can be disrupted and may be insufficient to ensure sand-free liquid L at the intake opening 64. Residual sand reporting to the intake opening 64 can cause localized erosion as the accelerating gas and liquid enter the fluid outlet and result in sand S appearing downstream in vulnerable equipment.

Third Stage

The shell 22, for sand S and gas G, and lower section 26 for liquids L and sand S, can act as initial apparatus for removing sand S. In some aspects, however, a third stage apparatus can be present in the form of a filter.

Accordingly, with reference to FIGS. 2 through 10, liquid filtering can be employed, such as through a filter 80 extending down into the liquid L from the intake opening 64 and into the lower section 26. A plurality of filter inlet openings are exposed to the accumulated liquid and a filter outlet is fluidly connected to intake opening 64 of the vessel's fluid outlet 62. Clarified liquid from the filter 80 joins the sand-free gas G at in the product stream P. The use of the shell 40 and filter 80 together can allow for enhanced removal of sand from the product stream P.

In one embodiment, the filter 80 is a stacked plate filter. According to one aspect of this disclosure, the filter 80 can comprise a stack of plates 82 having gaps therebetween, such as that disclosed in U.S. provisional patent application Ser. No. 62/433,495, filed on Dec. 13, 2016, and 62/529,309, filed on Jul. 6, 2017, the content of both of which is incorporated herein by reference in their entirety. The filter 80 is configured to separate residual particulates from the liquid. Residual sand may result from upset conditions, such as slug flow, or an undersized lower section for the mass rate of flow of liquids.

The filter 80 has a vertical extent which depends into the lower section 26. The filter 80 extends along at least an upper portion of the lower section 26, immersed in liquid L, producing clarified liquid for discharge through the fluid outlet 62.

Inflow through the filter 80 is generally distributed from a top 82 to a bottom 84, and governed by pressure drop along the filter. Thus, the filter 80 receives a distributed flow of liquid L thereby reducing the radial flow velocities of the sand S and liquid L flowing to the filter, minimizing disruption to the settling of the sand S in the lower section 26. Further, the distributed filtering minimizes flow velocity of any entrained sand S impacting the filter plates 90. The gas/liquid interface 72 is maintained adjacent the top end 82 of the filter 80 as liquid L is drawn up the fluid outlet 62 with the gas G. The filter 80 thereby provides lower radial velocities in the lower section 26.

Generally, the bottom edge 48 of the shell 40, and the top 82 of the filter 80, are at the same level or at a level above the bottom edge 48 of the shell 40. As before, the shell annulus 42 distributes the falling sand S around the inside perimeter of the vessel wall 34. The sand settles spaced away from the filter 80, located about the center of the vessel 22.

Figures 6, 7:
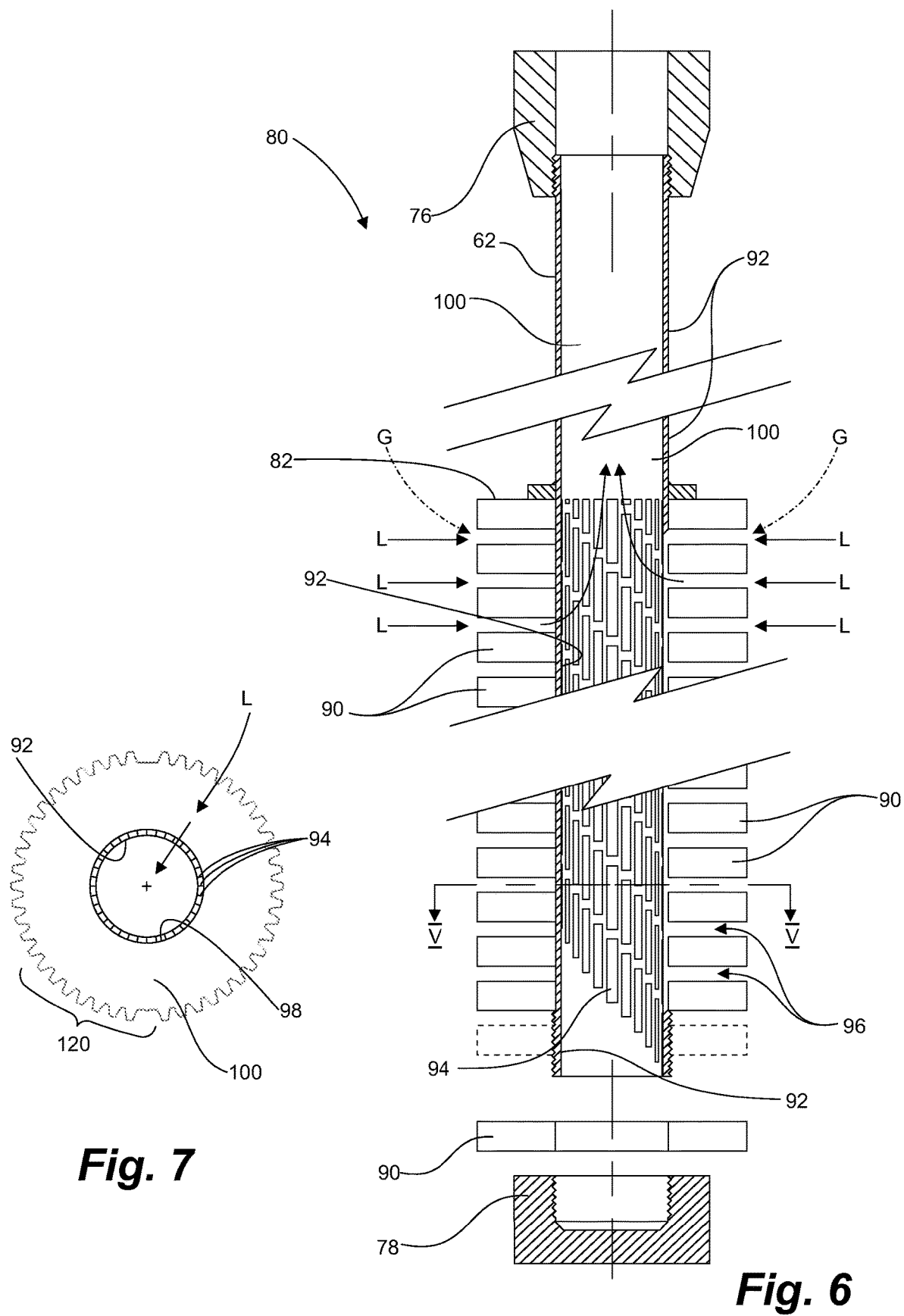
FIG. 6 is a cross-sectional side view of the filter stack of FIG. 2, the plates of exaggerated thickness and spacing, illustrating assembly to a supporting tubular mandrel.
FIG. 7 is a transverse cross-sectional view along section V-V of the filter stack shown in FIG. 6, showing a filter plate and mandrel therethrough.

As can be seen in FIGS. 3, 6, and 7, the filter 80 comprises a plurality of stacked discs or plates 90 supported on a mandrel 92 having fluid bore 100 being fluidly continuous with the intake opening 64 and fluid outlet 62. The mandrel 92 is a structural tubular having a plurality of passages 94 therethrough to bore 100, the passages being discrete slots spaced to retain sufficient structural competence to support the filter plates 90 thereon. As an example, the mandrel 92 could be a 3 inch pipe for supporting 6" diameter plates having corresponding 3" through-bores 98.

As shown FIGS. 4 and 6, the fluid outlet 62 is in the form of a vertically oriented cylindrical tubular or conduit. In this aspect, the top 36 of the vessel 22 has a piping aperture 74 sized so as to allow the fluid outlet 62 and the filter 80 and filter plates 90 to pass therethrough for assembly and disassembly. When a refurbished filter 80 is ready to be put back into use, it can simply be slid back into the vessel 22 through the piping aperture 74. A dognut 76, fastened adjacent to the top end of the filter mandrel 92 or fluid outlet 62, rests on a shoulder in the aperture (not detailed) to prevent the filter 80 and the fluid outlet 62 from falling into the vessel 22, while also suspending same vertically along the vessel axis. A flange or holddown retainer (not shown) can restrain the dognut 76 in the aperture 74.

The plates 90 can be planar and stacked in parallel, yet spaced, arrangement, each pair of plates 90,90 forming a generally uniform gap 96 therebetween for a plurality of gaps 96, 96 . . . . As can be seen in FIG. 7, each of the plates 90 can have an internal through-bore 98. The through-bore 98 is arranged to fit mandrel 92. Gaps 96 communicate the fluid passing therethrough to the conduit passages 94 and to the bore 100. The dimensions and orientation of each of the plurality of plates 90, 90, . . . can be identical or vary from each other for changing the gap or edge configurations. The filter 80 is supported in the vessel 22 by the mandrel 92. As shown in FIG. 6, the mandrel 92 can integrated with the tubular forming the fluid outlet 62.

Figure 8A:
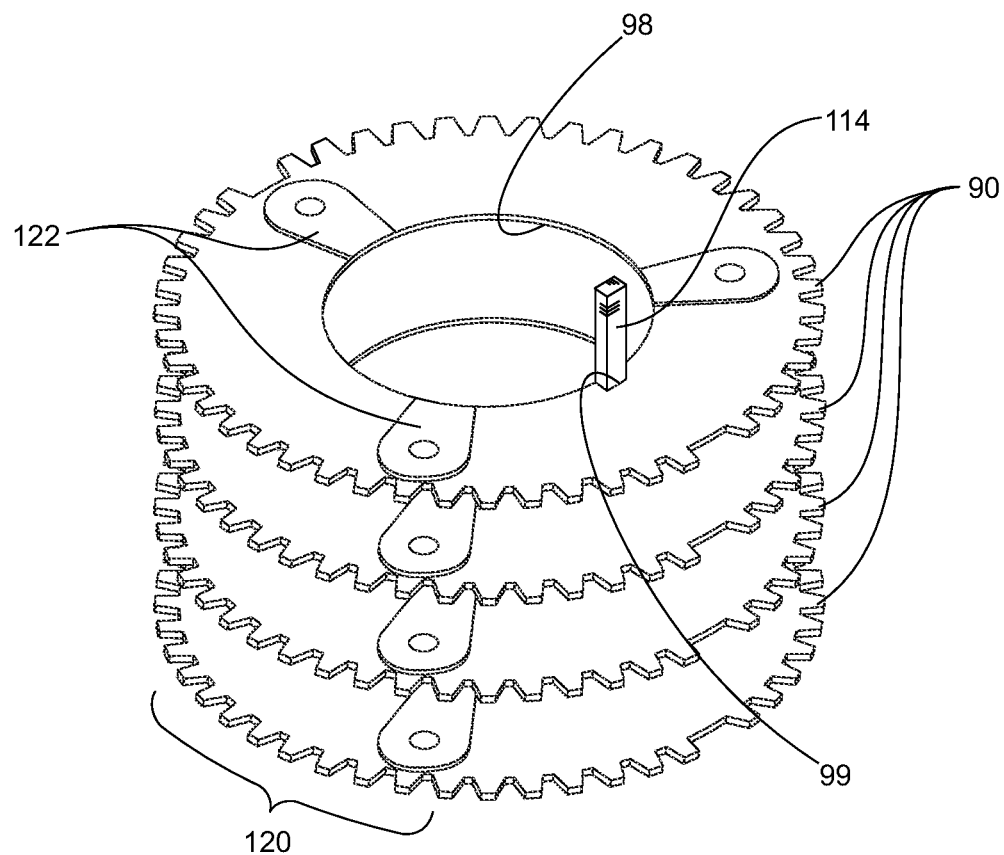
FIGS. 8A and 8B are perspective views of four filter plates in axially exploded view and an operationally stacked view respectively, with plate bosses providing inter-plate spacing therebetween.
Figure 8B:
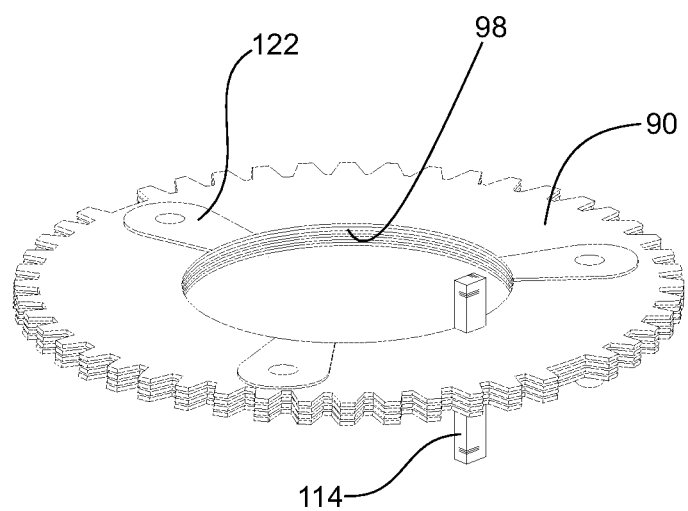

In FIGS. 8A and 8B, the individual plates can be assembled in a compact stack along an axis, the plates 90, 90 . . . rotationally aligned, as pertinent for the plate design, by keyway 99 in each plate's through-bore 98 and a key 114 associated with the mandrel 92. As shown in FIG. 6, the plates 90 can be stacked along the mandrel 92, and secured thereon with a nut or cap 78.

Liquid L can flow radially through the plurality of gaps 96 from out-to-in, which is normal operation, or in-to-out for backflushing. The size of the gap 96 between each pair of adjacent plates 90,90 is sized to exclude sand S from entering therein. An outer profile of the stack of plates of the filter 80 face the vessel interior 32 and an inner profile, or through-bore 98, is fluidly connected to the intake opening 64.

The gas/liquid interface 72 is disposed at or about the top of the filter 80, as a result of the gas intake opening 64. Gas G enters the intake opening 64, depressing the gas/liquid interface while aspirating liquid L therewith. Here, the gas intake opening 64 is the top plate or plates of the filter. For a given plate gap 96, the flow rate of gas G can orders of magnitude greater than that of the possible flow rate liquid L. Thus, the gas G monopolizes an upper gap 96, or a few upper gaps 96,96 of the filter as the intake opening. The liquid L from the lower section 26 is filtered along the balance of the filter 80, entering the fluid bore 100 and being discharged up the fluid outlet 62 with the gas G. The gas G is already sand-free from the first stage gravity separation and can be directly withdrawn from the vessel into the intake opening 64.

Pressure Control

During operation, the performance of the filter can be impeded through gradual obstruction or even blinding by a bed of sand accumulating in the lower section 26. The sand bed can gradually smother the filter 80. Normally declining filter performance is measured by an increasing pressure drop measured across the vessel's fluid inlet and outlets 60,62.

For a high pressure vessel, at rates in the order of 1000 m3/day of gas G, one can monitor the pressure differential between the fluid inlet 60, which can be at pressures in the order of 4,500 psig or more, and the fluid outlet 62. As residual sand S collects on about the filter 80 or settled sand encroaches on the filter generally, the pressure differential increases. As discussed later, when a threshold dP is reached, say about 25 psi, the filter can be backflushed and the lower section 26 can be purged of sand S to clear accumulated sand.

Here, reduced filter performance can result in a liquid bypass of the bulk of the filter, liquid L entering the gas intake opening 64 directly, as was the case in the prior art flow outlets. If concentrated at the top 82 of the filter 80, the net liquid for removal can generate a higher velocity, focused flow of liquid, and its entrained residual sand, sharing the gas intake opening 64. When the filter obstruction is not managed, multiple disadvantages can occur including firstly, the bulk of the filter is eventually bypassed with increasing sand reporting to the fluid outlet 62. This results in high velocities over fewer and fewer filter gaps adjacent the gas intake opening 64 with increasing carriage of sand S and resulting erosive effects at the upper filter plates 90. Further, degradation of filter performance is not readily detected as the filter structure erodes, as there is little differentiation in pressure differentials across the inactive filter 80 to signal filter blockage. The indicated overall pressure drop can be artificially low, having bypassed the liquid filter and moving directly to the intake opening 64. Accordingly, the liquid L can still contain some sand, reducing the effectiveness of the desanding vessel. With periodic backflushing and sand purging, normal operation of the filter 80 can be managed without monitoring of the filter condition.

However, should maintenance be neglected, or process conditions change for the worse, one can provide additional filter hardware to better establish pressure control and pressure differentials in the range of up to tens of psi (in the order of up to about 75 psi) or hundreds of kPa (up to about 500 kPa).

Figure 18:
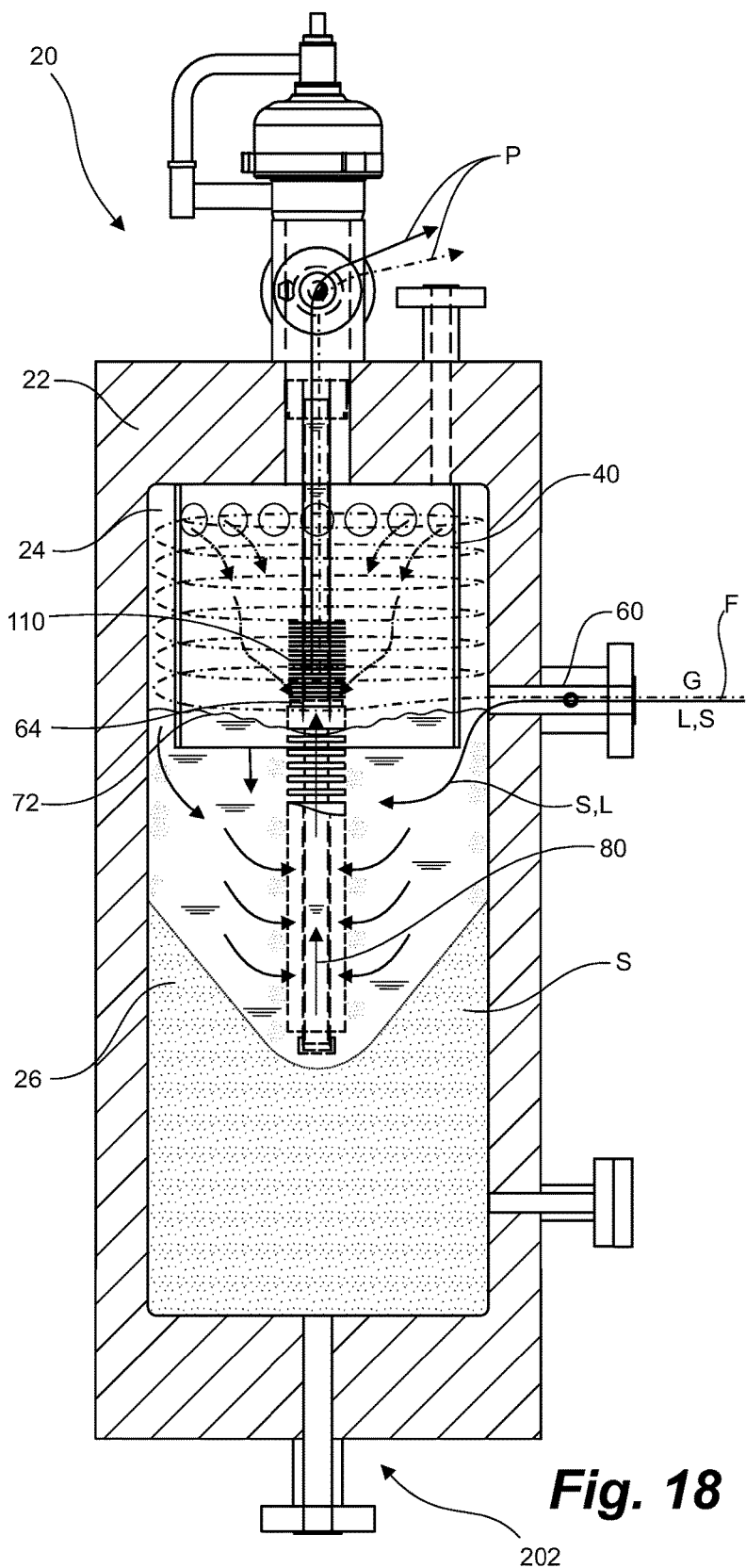
FIG. 18 is a cross-sectional side view of another embodiment of a desanding apparatus having an internal shell for facilitating gravity separation above a liquid and sand accumulation chamber below and a two-stage filter stack.
Figure 19:
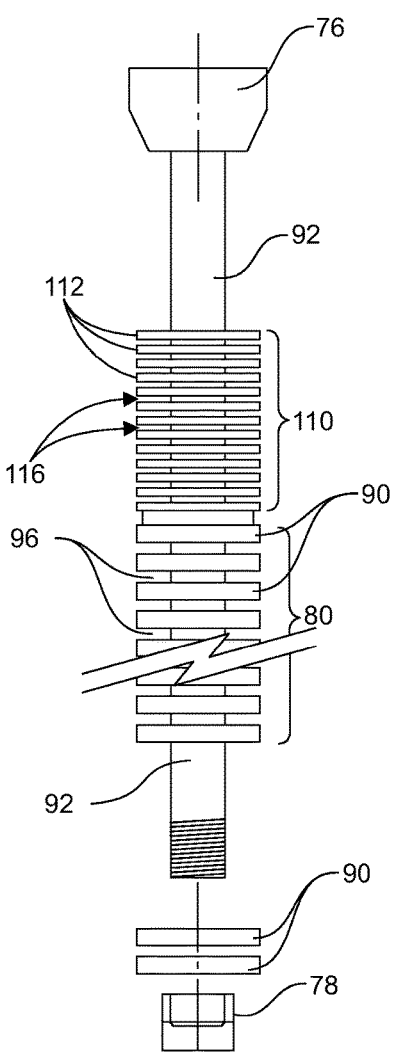
FIG. 19 is a cross-sectional side view of the two-stage filter stack of FIG. 18, both lip-type plates and plain plates of relative yet exaggerated thickness and spacing, illustrating assembly to a supporting tubular mandrel.

With reference to FIGS. 18 and 19, pressure differential or drop across the filter 80, for the detection of increasing filter obstruction, can be managed using an additional liquid-rejecting, diffuse gas intake 110 to the intake opening 64. The diffuse gas intake 110 is provided that readily permits the passage of the entirely of sand-free gas G, but does not easily pass liquid, if at all. As the pressure drop across the filter 80 increases and the gas/liquid interface encroaches on the diffuse gas intake 110 and becomes increasingly blocked by the incompatible fluid, forcing an increase in pressure differential across the combined filter 80 and diffuse gas intake 110. The liquid is incompatible with the diffuse gas intake 110 due to the differential fluid characteristics between gas and liquid including one or more of specific gravity, density, molecular weight, surface tension and viscosity. In other words, while gas readily flows through diffuse gas intake 110 with little pressure drop, liquid cannot pass and causes the gas to flow through an ever decreasing cross-sectional area of the diffuse gas intake 110, generating measurable pressure differentials.

The diffuse gas intake 110 is located at an elevation above the gas/liquid interface. The filter 80 is located below the gas/liquid interface 72.

In more detail, and with reference to FIGS. 7, 8A, 8B and 10A through 23B, the filter 80 and for diffuse gas intake 110 can both be stacked plate filters. The filter 80 is configured for filtering sand S from liquid L. The diffuse gas intake 110 is configured for filtering liquid L from gas G. For stacked plate filters, the above can be managed using a variety of designs including plate spacing, surface area at the filter gap interface.

As shown in FIG. 19, a representation is illustrated in which the diffuse gas intake 110 is configured as a stack of closely spaced plates 112, 112 .... The liquid filter 80 is configured as a stack of widely spaced plates 90, 90 .... The spacing between adjacent filter plates 90,90 is selected so as to exclude the residual sand in the accumulated liquid L. The spacing of adjacent gas intake plates 112,112 is based on restricting liquid flow therethrough, at least to velocities that avoid erosive energy levels.

For maximizing filter performance, the outer perimeter of each plate 90,112, forming the inlet to the respective gaps 96,116, can have a pleated edge 120 for increasing the surface area thereof.

Each plate 90,112 comprises the central bore 98 for receiving the perforated mandrel 92 forming the fluid bore 100 coupled to the fluid outlet 62.

In another embodiment, and as disclosed in Applicant's U.S. provisional 62/529,309 filed Jul. 6, 2017, the plate gap 96 can be further modified, other than merely gap spacing, for managing flow therethrough.

Figure 20A:
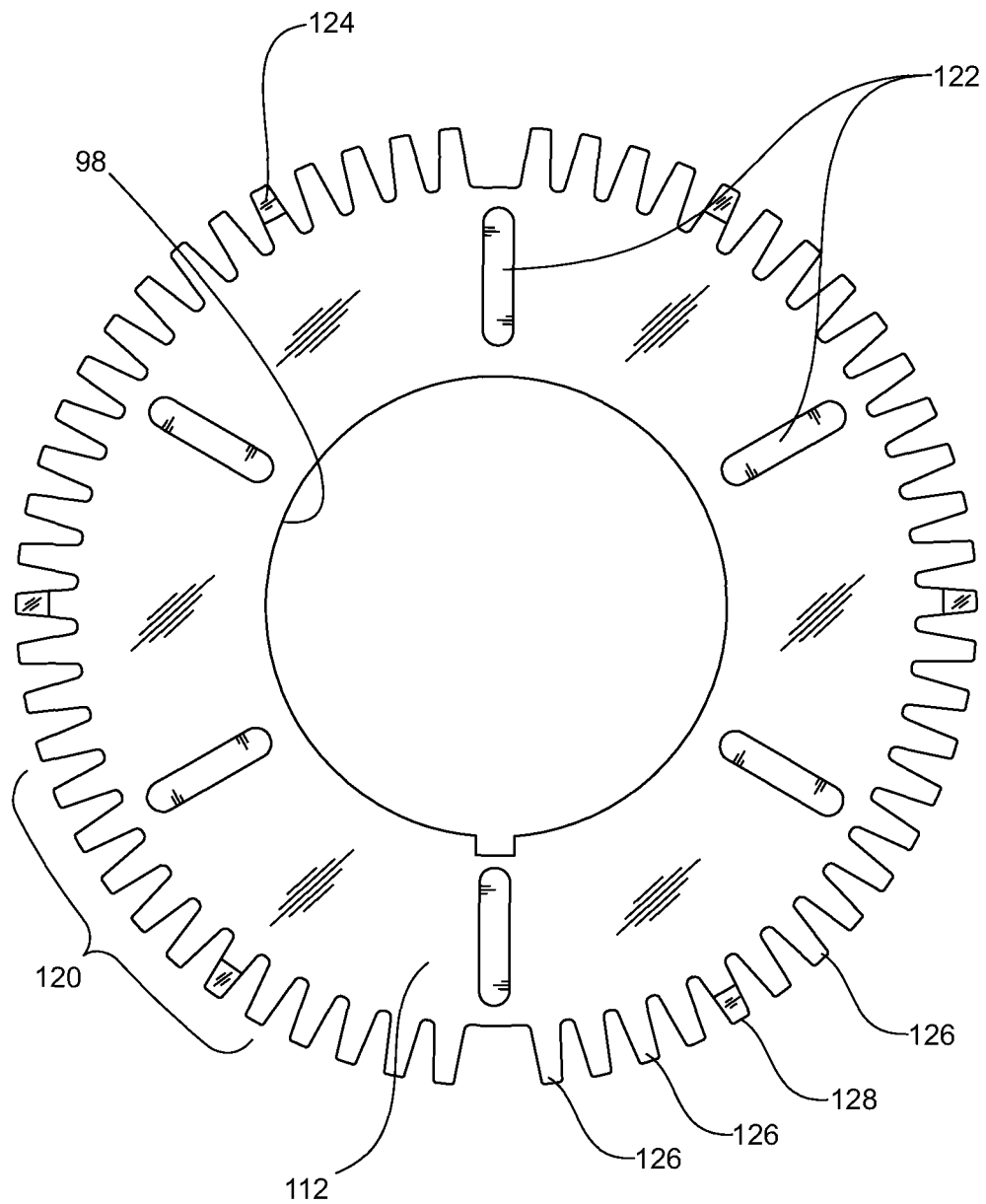
FIGS. 20A and 20B illustrate a plan view of a plain plate, and a perspective view of an example tooth of the plate of FIG. 20A respectively.

As shown in FIG. 20A, each plate 112 has a generally planer surface from peripheral pleated edge 120 to the internal through-bore 98. Plate bosses 122 space adjacent plates 112,112 at a process gap 116 to resist the flow liquid L of therethrough. The plate bosses 122 can be spaced about the plate's circumference at an intermediate radial orbit. For gap dimensional stability, plates 112 having a large radial extent, or which are subject to compressive forces can benefit from additional nib bosses 124 spaced about the plate's circumference at the pleated edge 120 and spaced circumferentially intermediate the plate bosses 122.

Figure 20B:
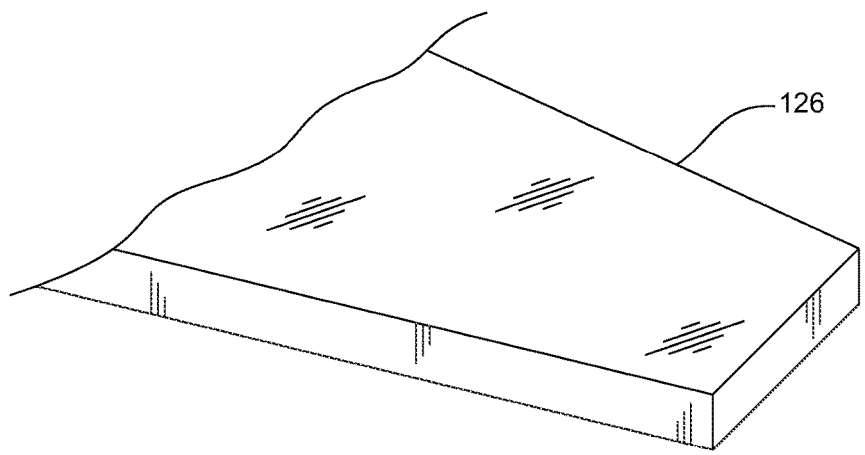
Figure 21A:
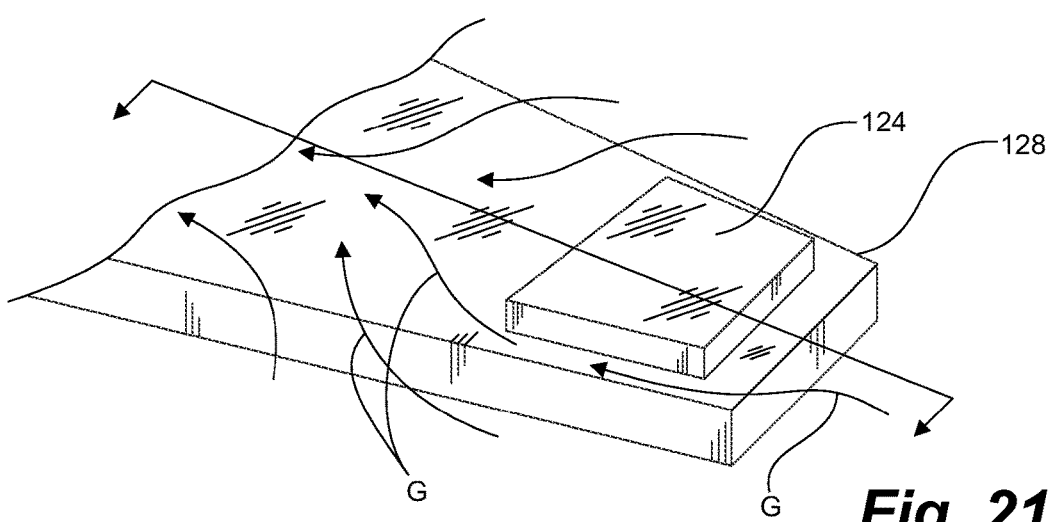
FIGS. 21A and 21B are perspective views of the example tooth FIG. 20B with a spacing nib boss thereon, and a side cross sectional view of teeth of adjacent plates respectively, the teeth of FIG. 21B being spaced by the nib boss and illustrating a rejected particle.
Figure 21B:
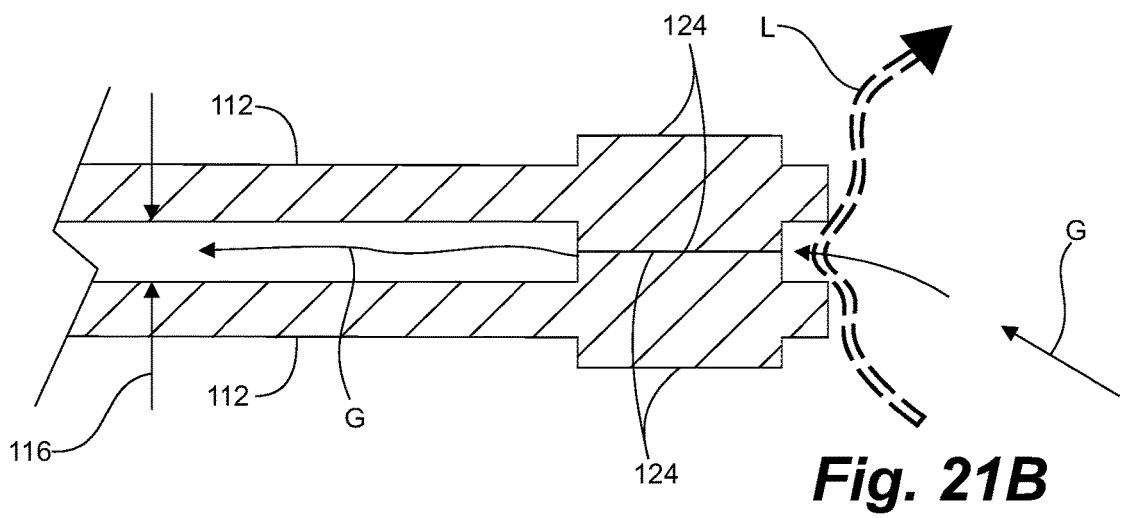
Figure 22A:
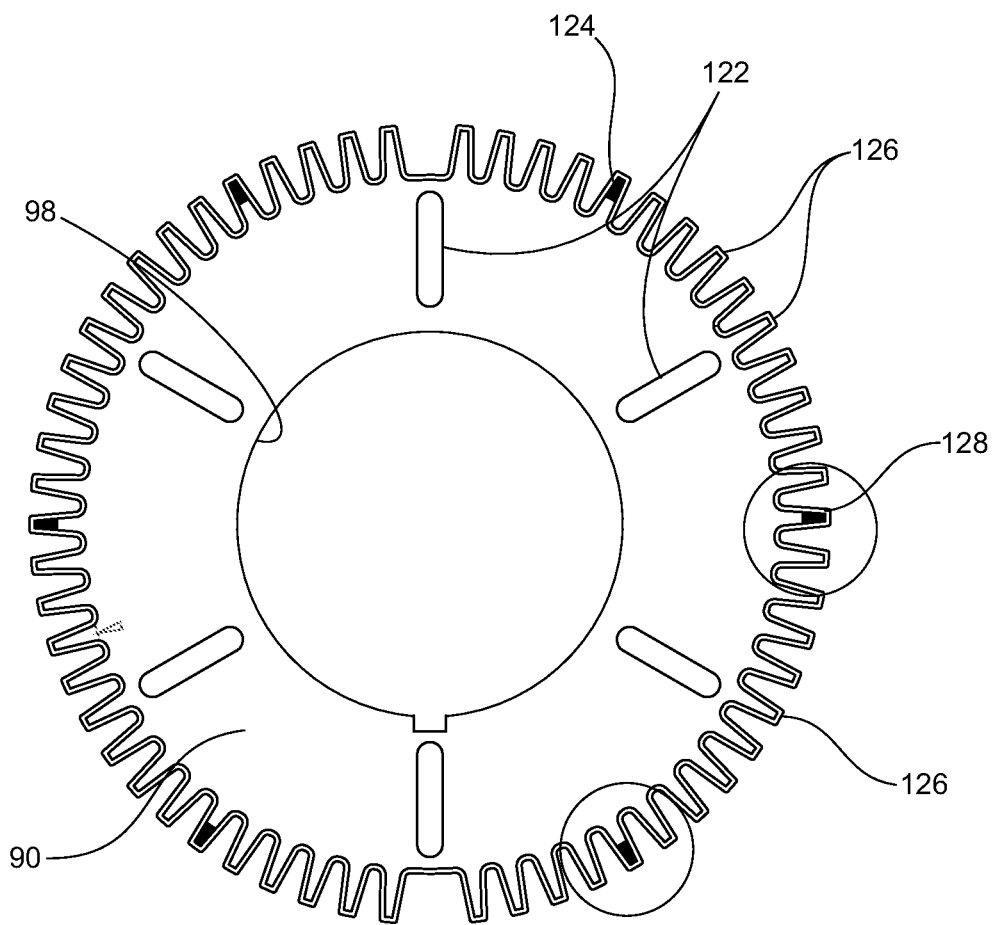
FIGS. 22A and 22B illustrate a plan view of a lip-type plate and a perspective view of an example tooth of the plate of FIG. 22A respectively.
Figure 22C:
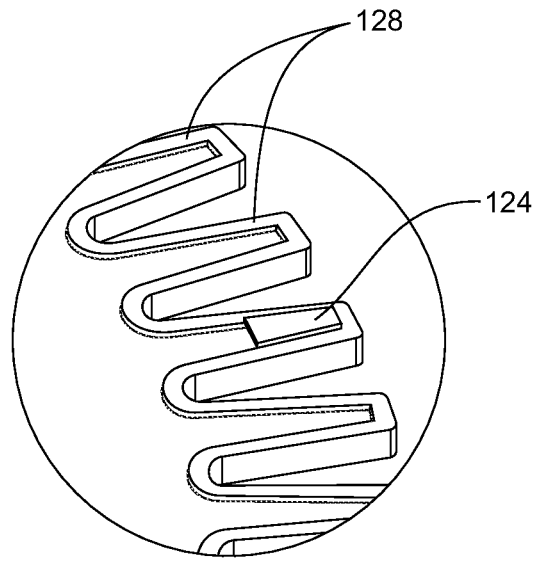
FIG. 22C is a perspective view of an angular portion of the lip-type plate of FIG. 22A, illustrating an intermediate tooth formed with a nib boss thereon.
Figure 22B:
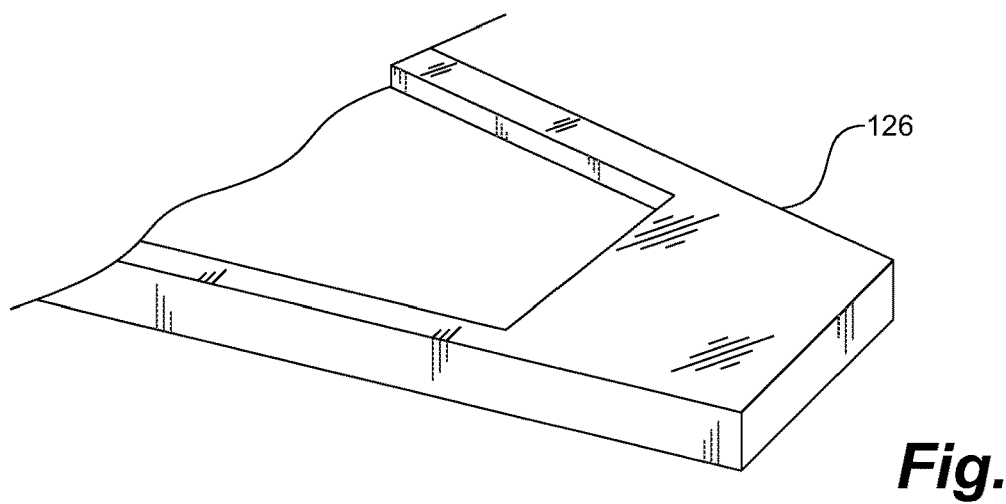
Figure 23A:
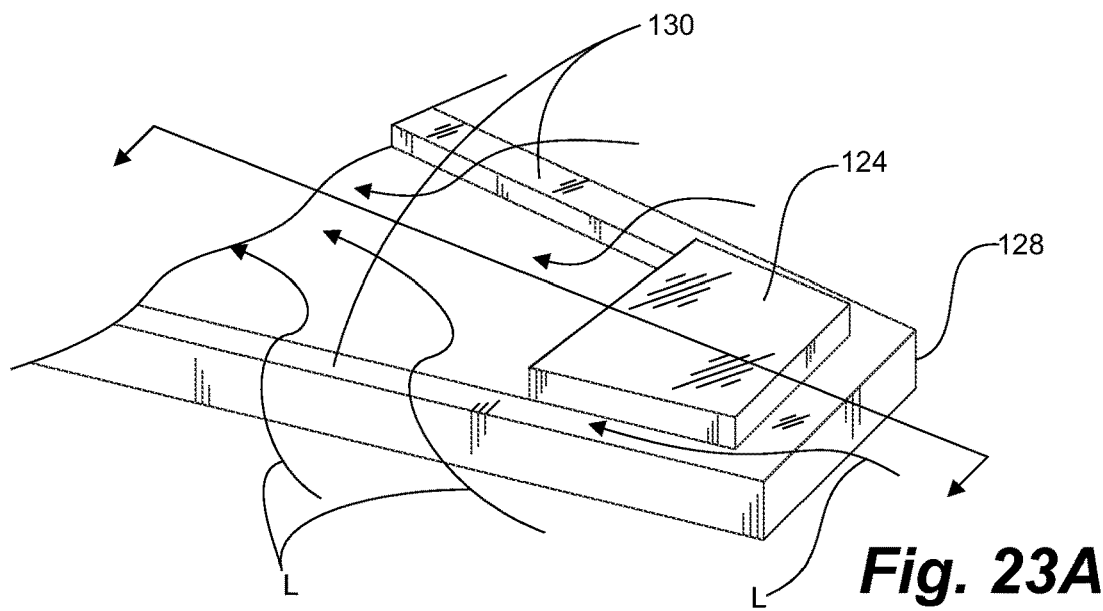
FIGS. 23A and 23B are perspective views of the example tooth FIG. 22B with a spacing nib boss thereon, and a side cross sectional view of teeth of adjacent plates respectively, the teeth of FIG. 21B being spaced by the nib boss and illustrating a rejected particle.
Figure 23B:
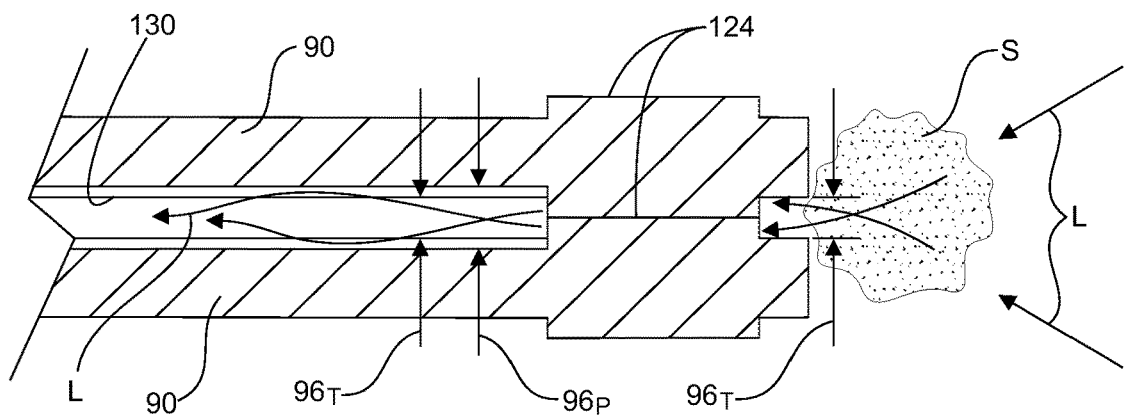
Figure 24:
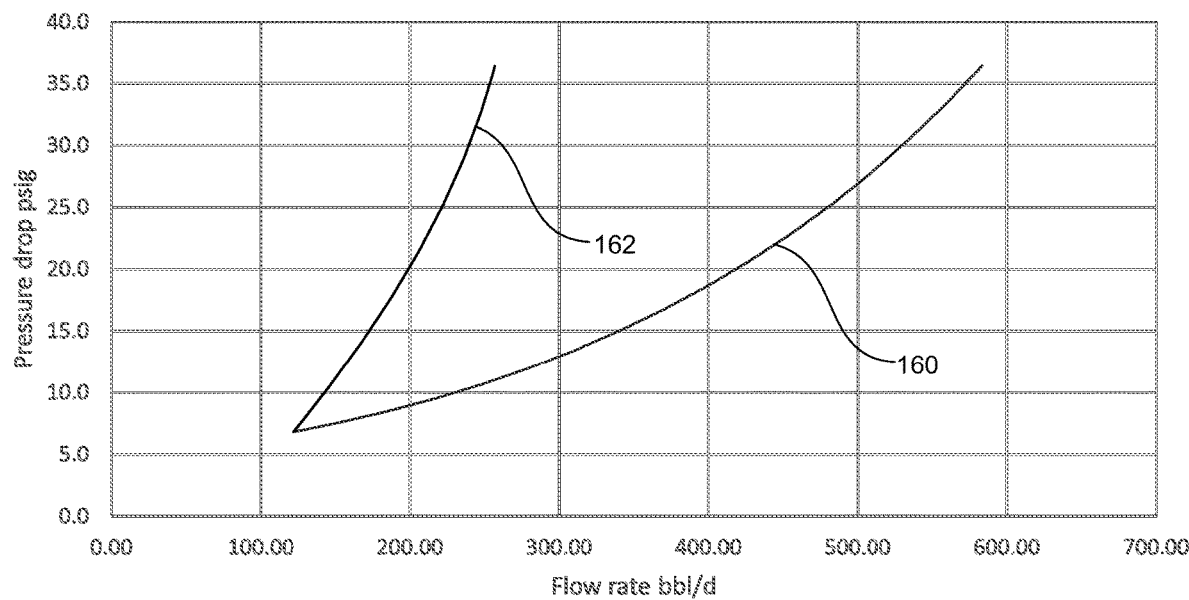
FIG. 24 is a graph illustrating the general pressure drop performance for stack of 95 plain filter plates, at gaps of 75 um and 100 um, tested on water.

With reference to FIGS. 20B, 21A and 21B, the pleated edge 120 comprises a plurality of teeth 126 and spaced teeth 128 having nib bosses 124 thereon. Adjacent plates 112,112 provide gap 116 that is amenable to the passage of gas G but not liquid L. As set forth in FIGS. 24 and 25, for a filter stack of 95 plates 112 of a nominal 6" outside diameter, water was forced through the plate gaps 96 with a corresponding steady increase in pressure differential. As shown by curve 160, for gaps 96 of 100 um, the pressure differential rose from 6 psi through 35 psi for flow rates of 120 through 580 bbl/d respectively. As shown in curve 162, repeating the test for a plate stack gap of 75 um, the pressure differential for water rapidly climbed to 35 psi at flow rates of only 260 bbl/d. Applicant is aware that pressure differentials for gas G through a similar stack at either 75 or 100 um are relatively unaffected. Accordingly for 6" filter at 75 um, liquid L is effectively excluded, while gas G can continue to pass therethrough, suitable for a diffuse gas intake 110.

In an illustration of plate gap modification, and with reference to FIGS. 21A, 21B, 21A and 21B, adjacent filter plates 90,90 provide gap 96 that is amenable to the passage of liquid but not sand S. Applicant has determined that, at sand exclusion gaps of 100 um, that the pressure drop was too high for useful application until inter-plate spacing was modified. Applicant believes that the closely-spaced plates are adversely affected by boundary layer or other liquid characteristic. Indeed, by providing a lip 130 to the periphery for forming a narrow gap 96T at 100 um for particle exclusion and a wider gap 96P therebehind for transport of the liquid to the through-bore 98, of say 200 um, reduces the pressure drop thereacross.

Figure 25:
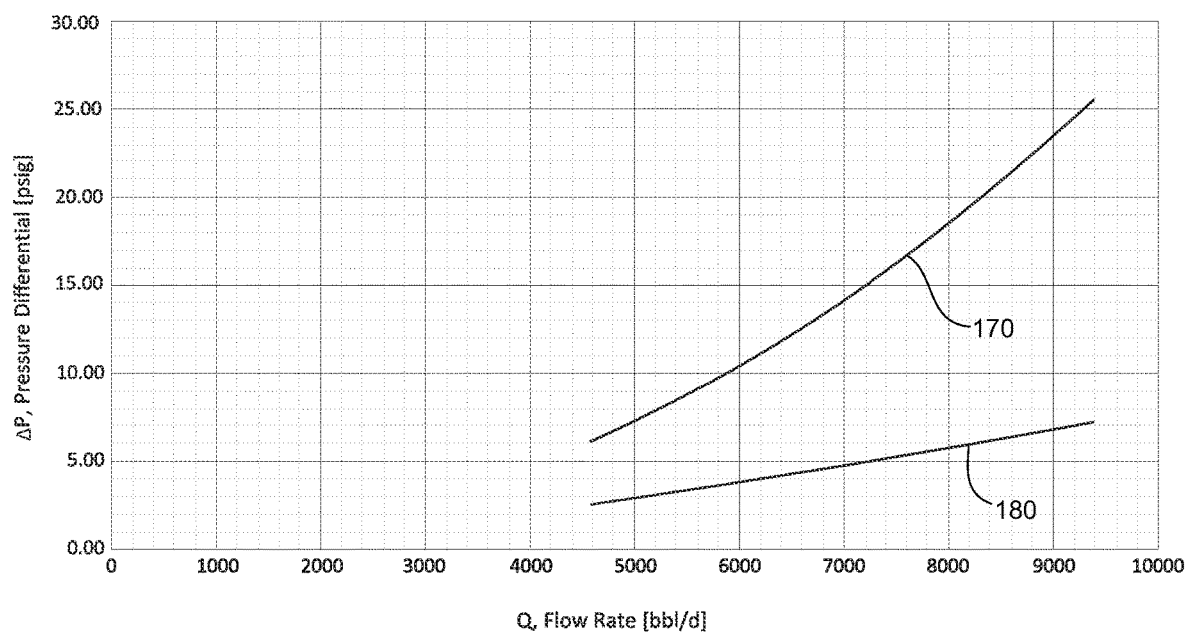
FIG. 25 is a graph illustrating the general pressure drop performance of a stack of 800 filter plates tested on water, the steadily increasing pressure drop demonstrated for plain plates and the modest pressure for shown for lip plates.

With reference to FIG. 25, for a high capacity stack of 800 filter plates 90 and 800 diffuse gas plates 112, the pressure differential was measured for water flow rates of between 4600 to 9400 bbl/d. Again, water was forced through the plate gaps for a steady increase in pressure differential for the entire stack.

As shown by curve 170 for plain plates 112 (FIG. 20A) with a simple uniform gap 96 of 100 um, the pressure differential rose rapidly from 6 psi to 26 psi for the flow range. Repeating the test for the lip-plates 90,90 (FIG. 12A) having a plate stack gap 96T of 100 um between facing lips 130,130, still suitable for sand exclusion, but with a plate gap 96P of 200 um the pressure differential for water only climbed from 3 psi to 7 psi for the same range of flow rates.

Accordingly for 6" filter at 100 um sand exclusion gap 96T of 100 um, liquid flow therethrough is nominally affected, suitable for the filter 80.

Gravity Settling with Filter

Applicant notes that several first and second stage gravity settling arrangements also benefit from the application of third stage filtering.

One of Applicant's prior desanders, issued as U.S. Pat. No. 9,861,921 on Jan. 9, 2018, includes a gravity separation apparatus in the form of an open top, open bottom spiral plate baffle 40S.

Figure 14A:
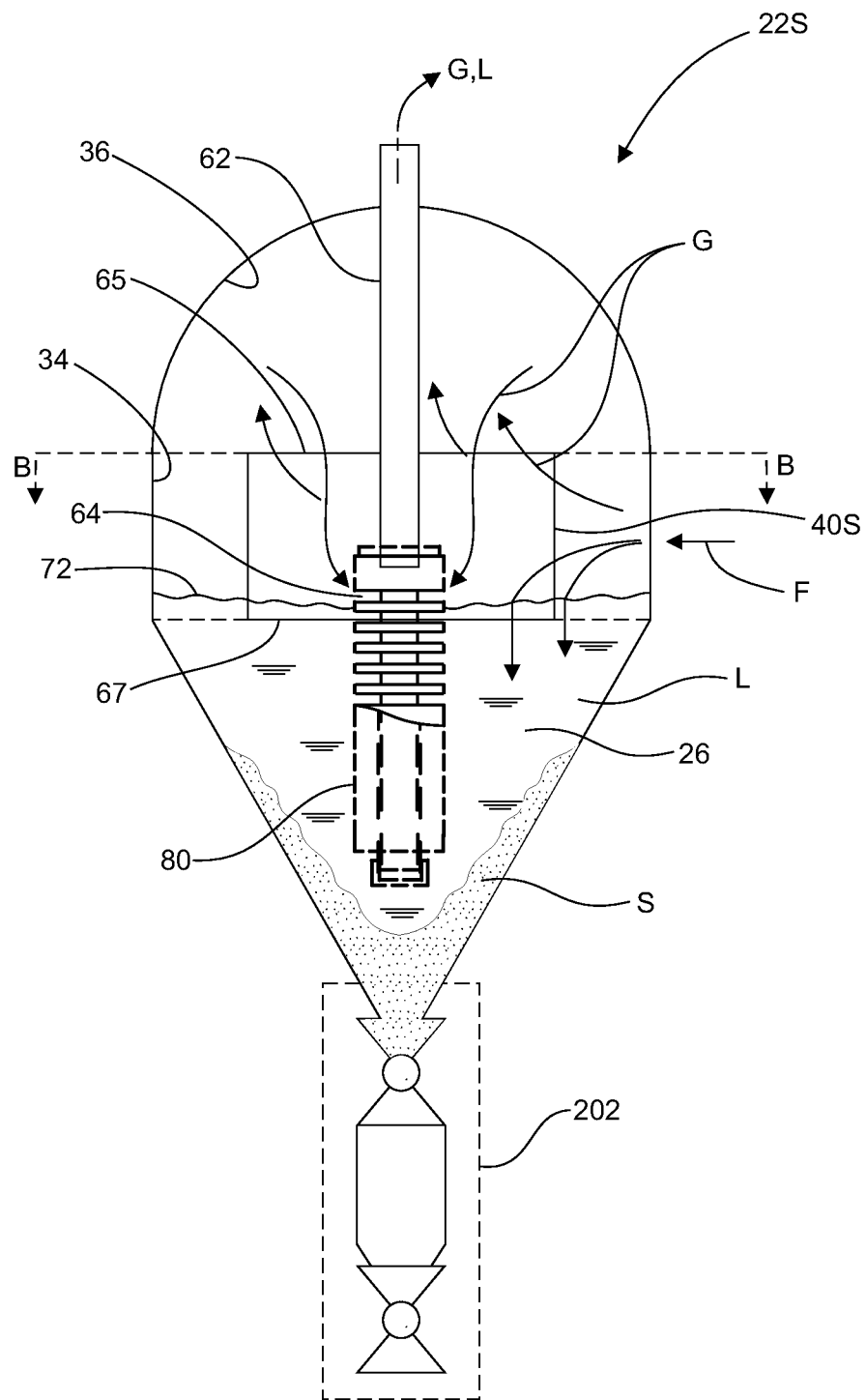
FIG. 14A is a cross-sectional schematic side view of Applicant's prior art spiral baffle gravity separation fit with a filter according to an alternate embodiment of the desander.
Figure 14B:
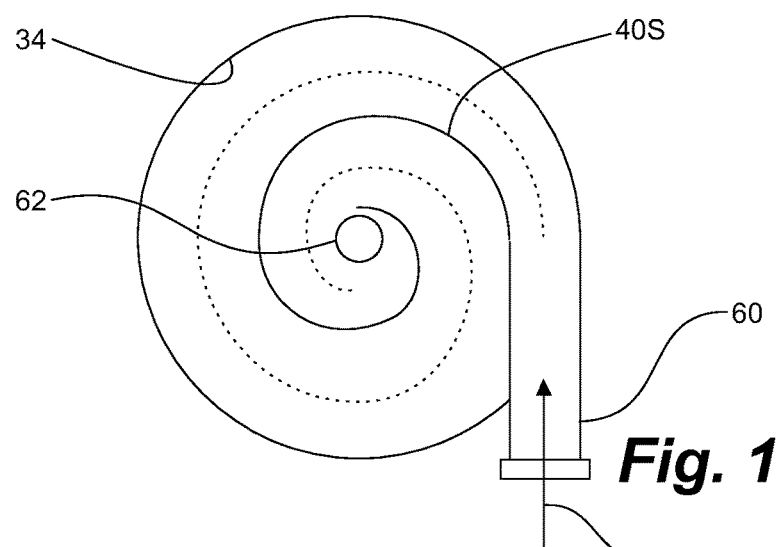
FIGS. 14B and 14C show a plan view and a rolled out side view respectively of a baffle according to FIG. 14A, FIG. 14B showing an elongated flow path about and through the spiral baffle, and FIG. 14C showing the upward separation of gas and downward separation of liquid and sand in a first and second gravity stage, coupled with liquid uptake into the filter stage to join the desanded gas product.
Figure 14C:
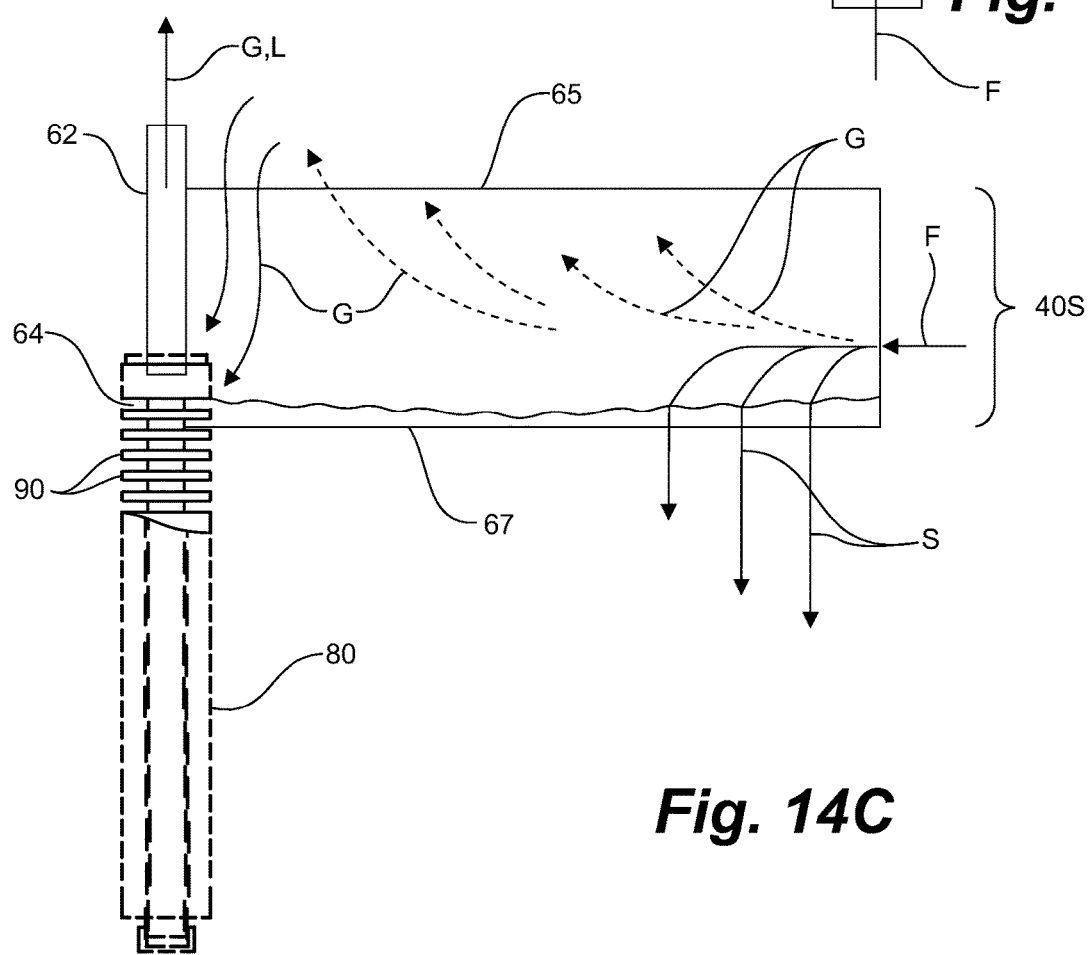

With reference to FIGS. 14A through 14C, Applicant's prior desander, implementing the spiral baffle 40S, is also enhanced with a filter stack extending into the accumulation chamber. FIG. 14C shows an "unwrapped side view" of the spiral baffle 40S and flow path on a two-dimensional plane. The spiral baffle 40S, is situate in a vessel 22S for receiving the fluid stream F from the fluid inlet 60 and directing the fluid stream F generally horizontally along an elongated spiral flow path within the vessel walls 34 from the fluid inlet 60 to the intake opening 64 of the fluid outlet 62. The gas G rises through the open top 65 to the vessel top 36 for return to the fluid outlet 62 while sand S and liquid L fall through the open bottom 67. For the same upset and process conditions described above, the fluid outlet 62 can benefit from additional of the filter 80 for residual sand exclusion. Residual sand that is not fully settled in lower section 26 is now excluded from the sand-free G and liquid L at the fluid outlet 62.

Figure 15A:
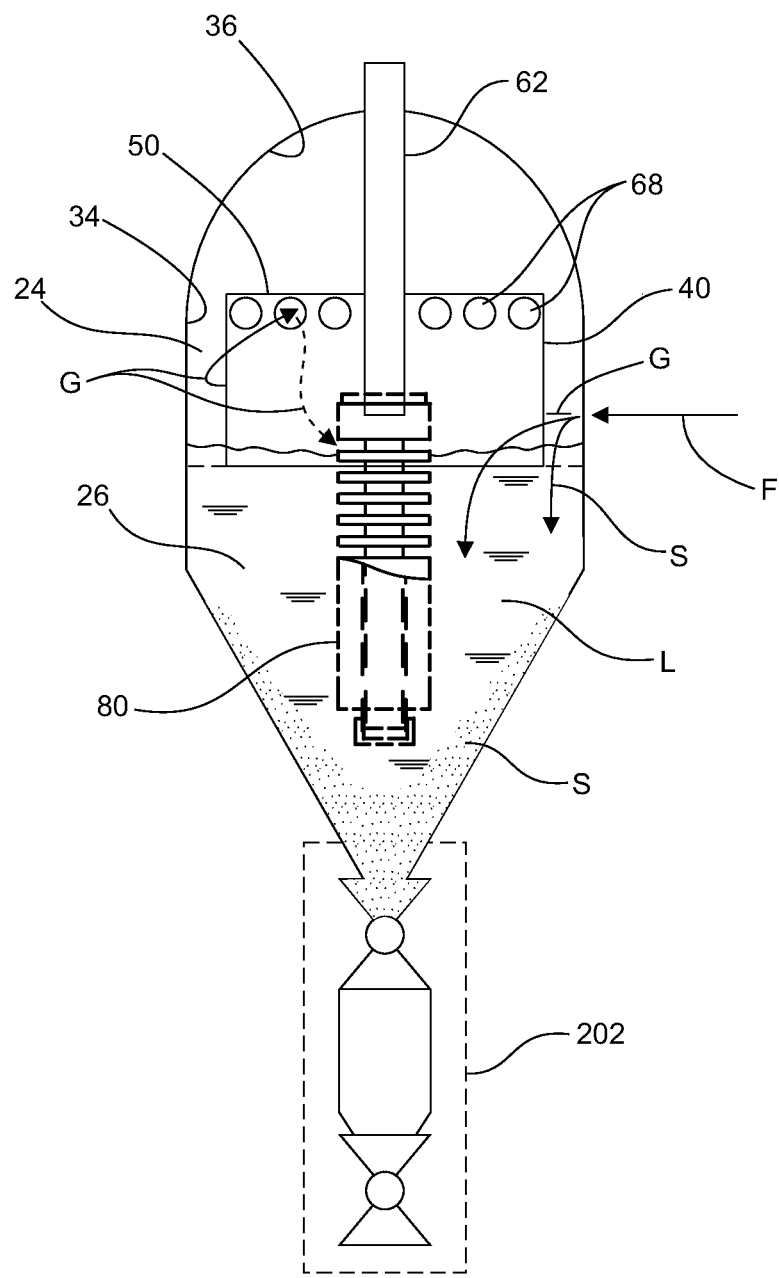
FIG. 15A is a cross-sectional schematic side view of the internal shell-type baffle gravity separation fit with a filter stack according to an alternate embodiment of the desander.
Figure 15B:
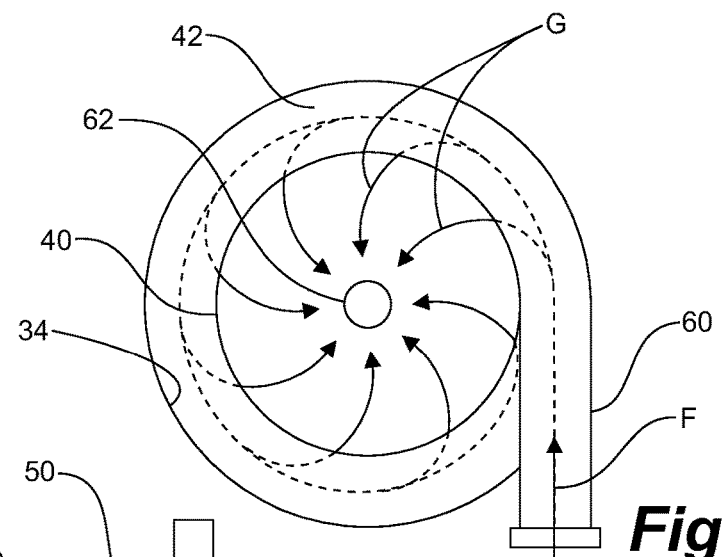
FIGS. 15B and 15C show a plan view and a rolled out side view respectively of the shell baffle according to FIG. 15A, FIG. 15B showing an elongated flow path about and through the apertures into the baffle, and FIG. 15C showing the upward separation of gas and downward separation of liquid and sand, coupled with liquid uptake into the filter stage.
Figure 15C:
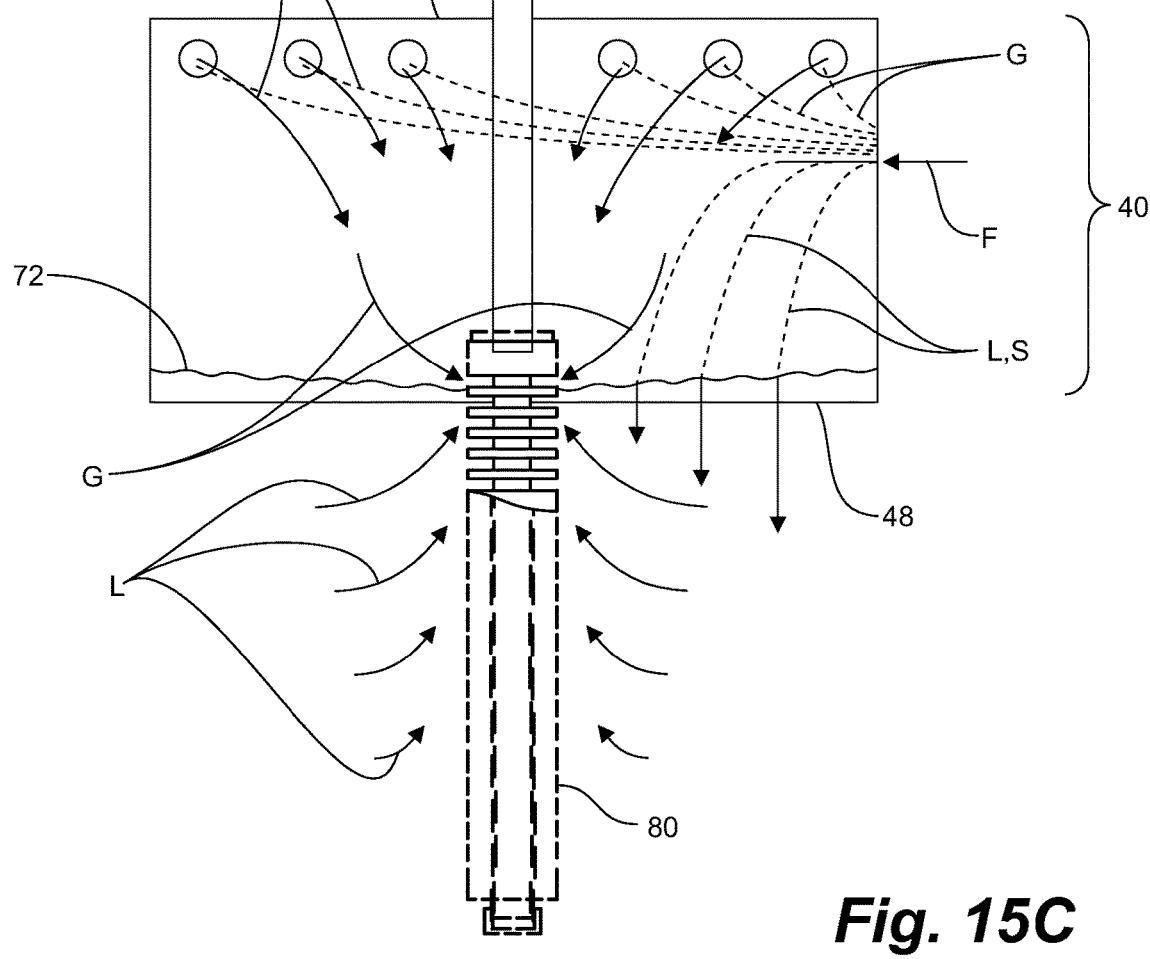

With reference to FIGS. 15A through 15C, and as introduced in FIG. 2, a first stage gravity setting apparatus can be the cylindrical shell 40 shown here in a form of vessel 22S of the embodiment of FIG. 14A.

The present disclosure introduces the open bottom shell 40 type of baffle which provides a size advantage over the open top, open bottom spiral baffle 40S of the prior desander according to FIG. 14A. Applied to the hemispherical vessel 22S of FIG. 14A, the cylindrical shell 40 provides a smaller effective diameter than the space—consuming spiral 40S. Accordingly either the diameter of the vessel can be reduced, or for a smaller vessel in which a spiral is too large and increases flow velocities, a shell 40 can be inserted therein. In the hemispherical vessel 22S, the shell 40 can be fit with a closed top 50, separate and distinct from the top 36 of the vessel 22S. In other respects the apparatus operates as described for FIG. 2.

With reference to FIGS. 15B and 15C, shell 40 receives the fluid stream F from the fluid inlet 60 for directing the fluid stream F generally horizontally along the elongated annular flow path within the vessel walls 34 from the fluid inlet 60 to the intake opening 64 of the fluid outlet 62, the gas G rising through the annulus to the apertures 68 at the shell top 50 for return to the fluid outlet 62 within the chamber 46 while sand S and liquid L fall from the annulus 42. As described previously the fluid outlet 62 benefits from the filter 80 for residual sand exclusion.

Sand Purge

In this embodiment, accumulated sand can be purged from the vessel without involving the filter.

After the start of the operation, sand S and liquid L accumulate in the lower section 26, forming a liquid surface. The freeboard interface 72 represents the highest level that the liquid surface may reach and is determined by the vertical position of the intake opening 64 of the fluid outlet 62, which aspirates, draws or otherwise receives the liquid L that rises upwardly thereto, while and gas G flows downwardly to the intake opening 64 for discharge.

With reference to FIG. 4, during operation, the filter 80 is open to the liquid L in the lower section 26, filtering and residual sand S in the liquid L before discharge through fluid outlet 62, as shown in FIG. 2, over time and more quickly in situations in which the fluid stream F contains a significant fraction of sand S, the sand S accumulates quickly to eventually bury the filter 80. The desanding process is compromised as the filter is rendered ineffective and if the accumulated sand S reaches the intake opening 64 the fluid outlet 62. In some aspects, as shown in FIGS. 14A and 15A, the lower section 26 could further comprise conical, inclined side walls narrowing downward to the bottom 38. The slope of the side walls of the lower section could be characterized by an inclination angle β between the wall and a horizontal plane that is about or larger than the angle of repose of a bank of liquid-wet sand S, to facilitate sand S migration or flow towards the bottom 38 of the vessel and toward the discharge port 200.

Figure 9:
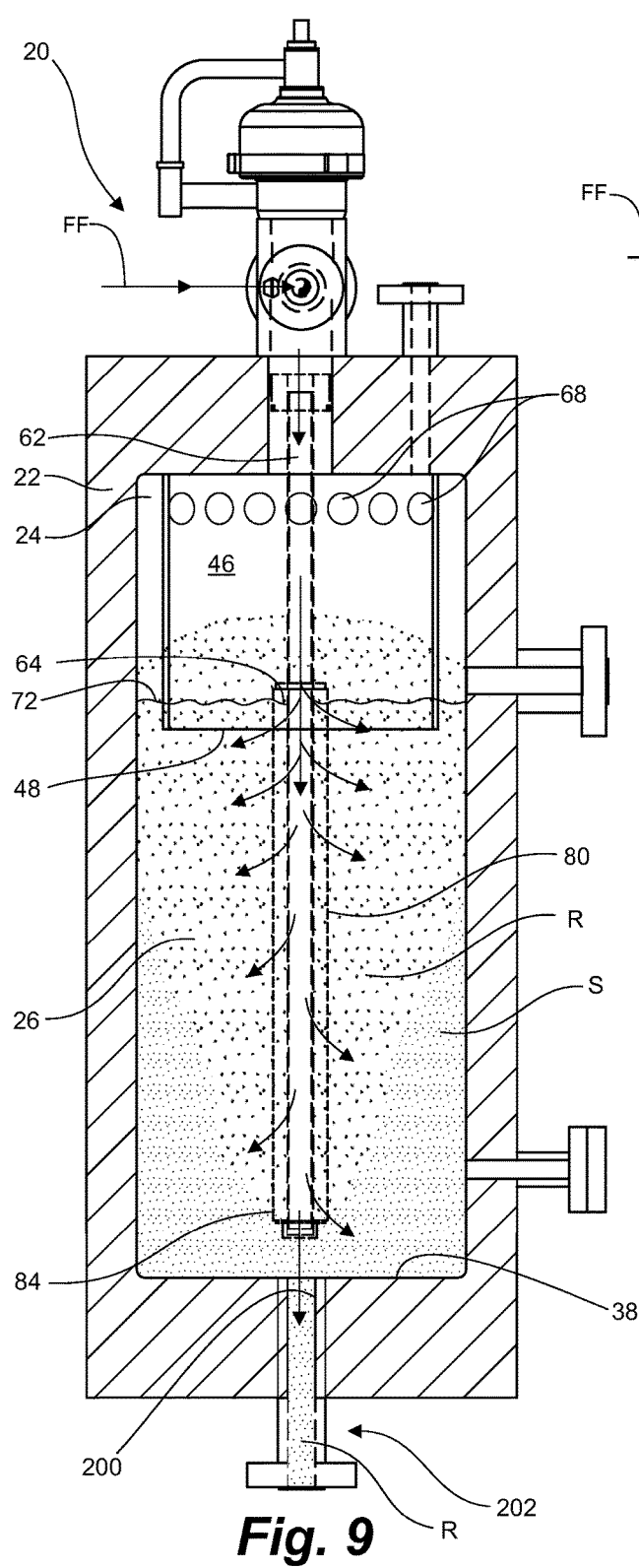
FIG. 9 is a cross-sectional side view of the desanding apparatus of FIG. 2 illustrating a flushing or backflow step.
Figure 10:
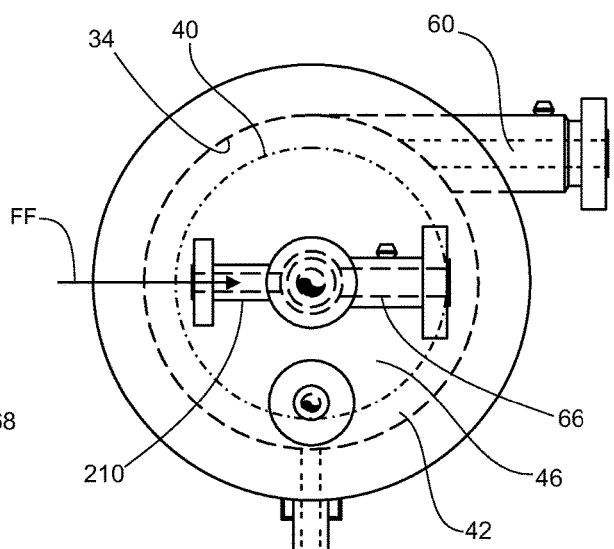
FIG. 10 is top view of the desanding apparatus of FIG. 9.
Figure 11:
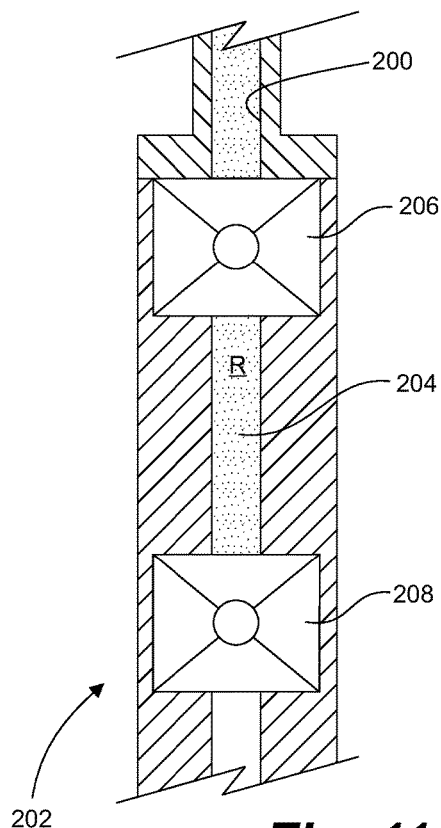
FIG. 11 is a schematic view of a double-valve for particulate removal.
Figure 13:
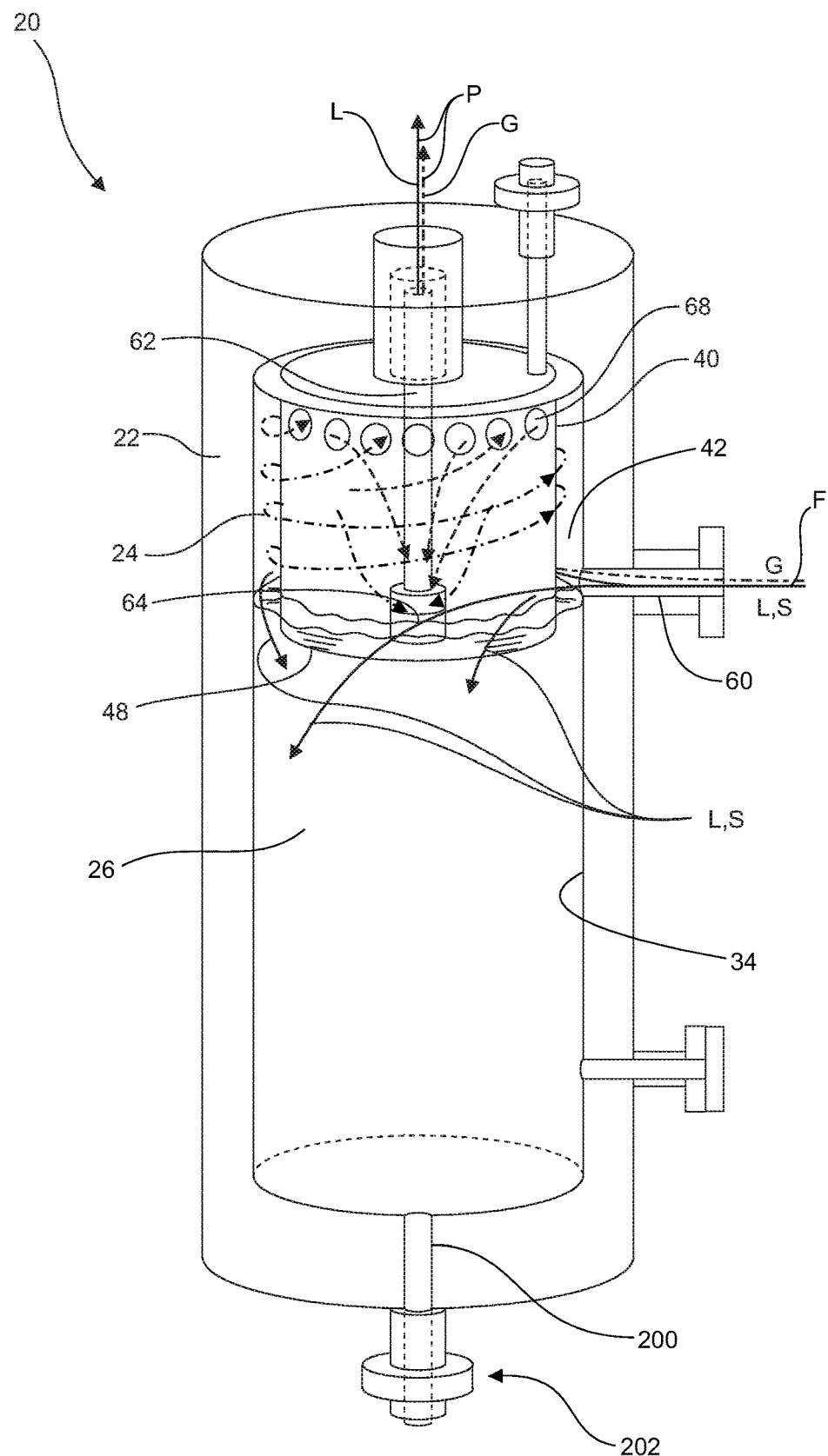
FIG. 13 is a perspective view of an alternate embodiment of an internal shell gravity separation desanding apparatus, absent a filter stack.

With reference to FIGS. 9, 10 and 11, the lower section 26 is generally cylindrical with bottom 38 upon sand S collects. A discharge port 200 through the bottom is coupled with a sand discharge structure 202.

Unlike many prior art desanders that require shutting down the operation to depressurize the vessel for removing accumulated sand S, the removal of accumulated sand S can be conducted periodically from the pressurized vessel 22 while in operation. For this purpose, the inlet and discharge valves 206,208 can be controlled manually by an operator, automatically with a timer or using sensors and controls such as an ultrasonic sand detector to periodically open and close. Typically, an interlock is used to prevent the inlet and discharge valves 206,208, from being open at the same time, preserving the pressure boundary.

In an embodiment, and as shown schematically in FIG. 11, the sand discharge structure 202 comprises a double-dump valve having sand lock chamber 204 sandwiched between the inlet valve 206 and a discharge valve 208. The inlet valve 206 is connected to the interior of the vessel 22 at discharge opening 200. The sand lock chamber 204 is in turn connected to the discharge valve 208 therebelow. Sand S, liquid L, or a slurry thereof adjacent the discharge port 200 can fall through to the inlet valve 204, and if open, fall into the sand lock chamber 204.

In particular, the inlet valve 206, between the discharge port 200 and the sand lock chamber 204, is normally open except at the time of sand removal, allowing sand S to fall into the sand lock chamber 204. The discharge valve 208 is normally closed except at the time of particulate removal.

To remove sand S while maintaining the desanding apparatus 20 in operation, the inlet valve 206 is initially closed. Discharge valve 208 is opened to allow any sand S contained in the sand lock chamber 204 to fall out. Discharge valve 208 is closed and inlet valve 206 is then reopened to allow sand S in the lower section 26 to migrate into the sand lock chamber 204. The inlet valve 206 is again closed to repeat the sequence as required.

In another aspect, if line washing is desired and downstream sand removal piping is able to support the process pressures, inlet valve 204 can be left open, opening or cycling discharge valve 208 for a short period of time, or pulsed, to allow a measured volume of sand to be evacuated under vessel pressure. To minimize disruption to the gravity desanding and the gas/liquid interface, the discharge rate and duration is controlled to limit exhaustion of the liquid inventory thereabove. This is hard on equipment as the discharge valve 208 is throttled to control flow therethrough, resulting in high pressure, high velocity abrasive flow. Specialty valves may be specified to handle the erosive nature of the operation.

Persons skilled in the art will appreciate that the lower section 26, can have sufficient volume to store sand S, set primarily by vessel height, inside the vessel 22 between practical cleaning cycles. Both inlet and discharge valves 206,208 can be service rated for abrasive slurries.

Those skilled in the art will appreciate that the particulate collection structure 250 may alternatively comprise different components including simple valves, a blind, or quick access port that is closed during desanding operations, and is only opened for cleaning out accumulated sand.

Backflushing

In some embodiments, the filter 80 may need to be backflushed. The backflushing procedure amounts to both a filter related cleaning and removal of sand from the vessel.

The gaps 96 between filter plates 90 may become clogged or otherwise obscured, including by paraffin wax. Plate cleaning can be mechanical, such as through scraper or temporary gap increase. However, these techniques often require access to the vessel or to the filter such as through seals. Herein, a backflush technique is provided without a need for access to the vessel interior 32.

Sand S can get embedded in the plated gaps 96. Furthermore, sand S can get packed into the bottom of the lower section 26, thereby blocking the filter, or the discharge port 200 or the discharge structure inlet valve 206. When sand S embeds or obscures the gaps 96, a pressure differential thereacross increases. When the differential pressure gets too high and can affect the process operations, the filter and accumulated sand can be cleaned.

In another aspect as the filter becomes blocked at the filter interface, or through blockage of the filter by accumulated sand not otherwise removed through periodic sand removal, a backflush can be effected, cleaning the filter and which can be extended to removing sand.

As can be seen in FIGS. 9 and 10, the vessel can be backflushed to clean blockage of the filter 80, fluidize packed sand S in the lower section 26, or both for ease of removal. This is an offline process.

In one embodiment, the vessel 22 is bypassed by shutting in the upstream fluid inlet 60 and downstream fluid outlet 62 at product port 66. A backflush port 210, adjacent the top of the vessel 22 and for convenience is connected to the fluid outlet 62 through a tee connection, is normally closed and opened only for flushing. The sand discharge structure inlet and discharge valves 206, 208 can both be opened and the backflush port 210 is opened for introducing a flush fluid FF. Flush fluid FF can then be pumped down the fluid outlet 62 to discharge inside the vessel 22.

In another embodiment, the vessel need not be fully isolated. A source of flush fluid FF can be the downstream equipment. Pressurized fluid, such as product gas, can be used to energize the backflush. In this case, the fluid outlet can be fluidly connected to flush fluid through either the product port 66 or through the backflush port 210.

Figure 17:
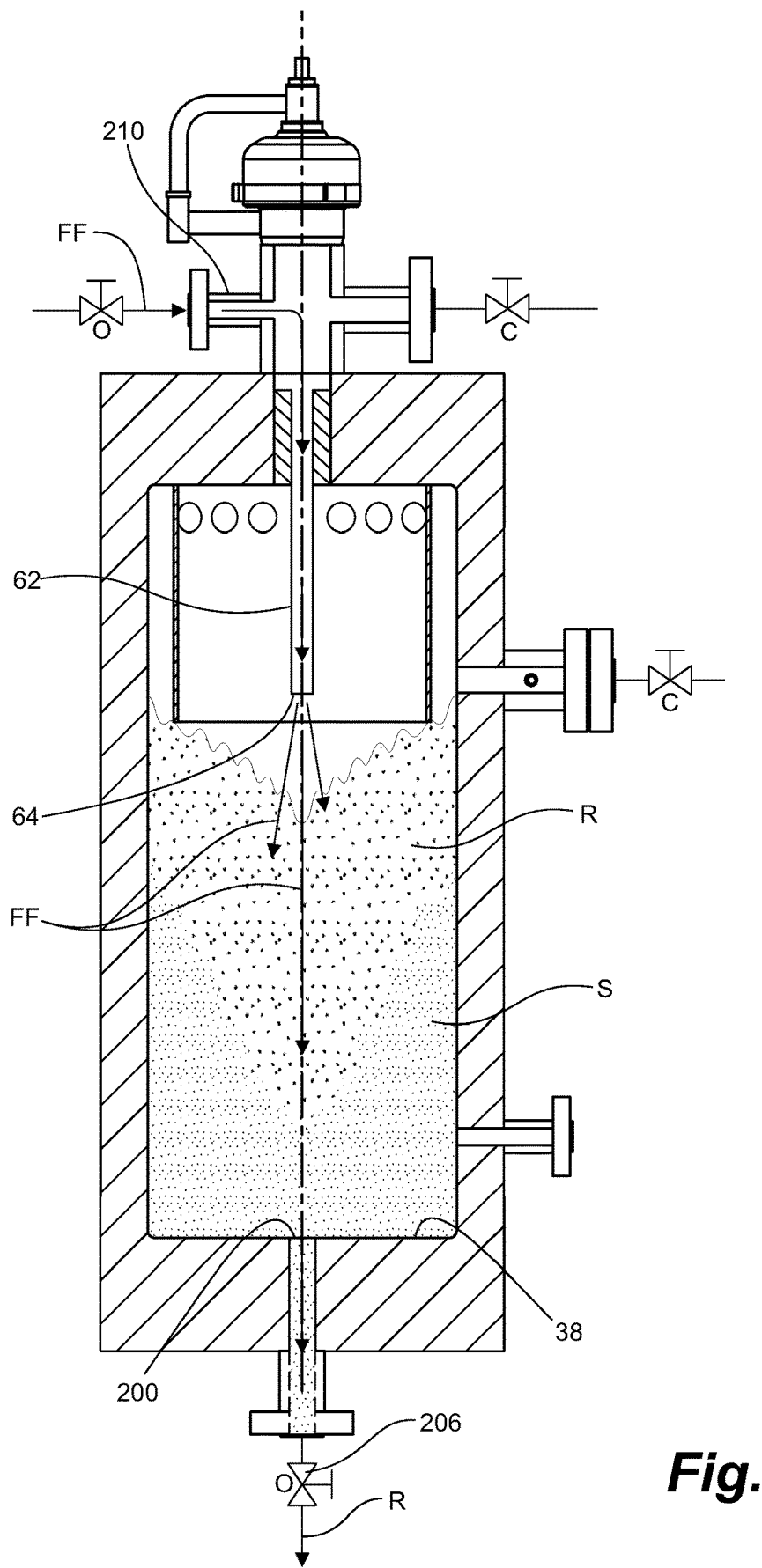
FIG. 17 is a cross-sectional side view of the desanding apparatus of FIG. 16B illustrating a flushing or backflow step.

Absent a filter 80, such as in the case of FIG. 17, the flush fluid FF, such as water, can exit the intake opening 64 to fluidize the accumulated sand pack, forming a slurry R for discharge out of the bottom port 200.

Further, with a filter 80 depending from the intake opening 64, as shown in FIG. 9, flush fluid FF can back flush through the bore 100 of the filter 80 and out filter gaps 96 to remove embedded sand S and to fluidize any of the accumulated sand bank encroaching about the filter 80. The slurry R can be removed through discharge port 200. While the vessel is offline and isolated from process pressures, sand S can be purged without opening the vessel 202 to the atmosphere. To minimize process interruptions, the vessel 22 could be made large enough to store up to 5 tonnes of sand S before needing purging.

I claim:

1. A vessel for removing at least sand from a multiple-phase fluid stream containing at least gas, entrained sand and entrained liquid, the vessel comprising:
   a vessel interior having a vertical axis;
   a fluid inlet for discharging said fluid stream generally horizontally into the vessel interior, the fluid stream having a first velocity;
   an outlet tube comprising an intake opening at a bottom end thereof for receiving a sand-free, desanded gas stream from the vessel interior, the outlet tube extending out of the vessel for discharge of the desanded gas stream;
   an upright baffle within the vessel interior and having a baffle exterior, a baffle interior and an open bottom,
   the baffle exterior directing the fluid stream generally horizontally along an elongated flow path about the baffle exterior and to the baffle interior from the fluid inlet to the intake opening of the outlet tube,
   a length of said flow path being longer than a direct distance between the fluid inlet and the intake opening of the outlet tube, the flow path from the baffle exterior to the baffle interior being through at least one top opening through the baffle, the baffle's top opening being at an elevation above the fluid inlet and the open bottom being at an elevation below the fluid inlet, the intake opening of the outlet tube located within the baffle interior at or below the elevation of the fluid inlet and above the open bottom,
   the fluid stream being directed along the flow path at a second velocity less than the first velocity whereby sand-free gas from the multiple-phase fluid stream rises, at an uplift velocity less than an elutriation velocity of the sand and the sand and liquid fall from the fluid stream, the liquid accumulating in the bottom of the vessel interior for forming a liquid interface between the sand-free gas above, and the accumulated liquid below, the elevation of the interface forming at the intake opening of the outlet tube and excess liquid being aspirated into the intake opening, the sand falling from the flow path settling in the accumulated liquid for at least partially clarifying the liquid at about the interface; and
   a sand filter extending from the intake opening and into the accumulated liquid for filtering remaining sand from the excess liquid aspirated into the intake opening for withdrawing both the sand-free gas and a sand-free excess liquid.

2. The vessel of claim 1, wherein the baffle is an upright spiral plate baffle, wherein the baffle's top opening is formed by open top of the spiral baffle at an elevation above the fluid inlet.

3. The vessel of claim 1, wherein the vessel interior is cylindrical.

4. The vessel of claim 1, wherein the filter has a plurality of filter inlet openings exposed to the accumulated liquid and a filter outlet fluidly connected to intake opening of the outlet tube.

5. The vessel of claim 4, wherein the filter comprises a stacked-plate filter, the plates arranged along a vertical axis, an outer filter periphery of which form the plurality of filter inlet openings, the elevation of the plates located at the elevation of the intake opening and extending therebelow.

6. The vessel of claim 5, wherein the plates of the stacked-plate filter are arranged about a mandrel having a filter bore fluidly connected to the intake opening of the outlet tube, the outer filter periphery facing the vessel interior.

\* \* \* \* \*